United States Patent
Dinzinger

(10) Patent No.: US 12,421,356 B2
(45) Date of Patent: Sep. 23, 2025

(54) GRANULATE OF ONLY NATURAL CONSTITUTIONS; GRANULATE FOR THE MANUFACTURE OF COMPOSABLE PRODUCTS AND METHOD FOR MANUFACTURING THE GRANULATE AND THE PRODUCTS OBTAINED THEREFROM

(71) Applicants: HOPE TREE HOLDING GMBH, Geretsried-Gelting (DE); HOPE TREE INTERNATIONAL GMBH, Holzkirchen (DE)

(72) Inventor: Lambert Dustin Dinzinger, Geretsried-Gelting (DE)

( * ) Notice: Subject to any disclaimer, the term of this patent is extended or adjusted under 35 U.S.C. 154(b) by 0 days.

(21) Appl. No.: 17/924,667

(22) PCT Filed: May 11, 2021

(86) PCT No.: PCT/EP2021/062550
§ 371 (c)(1),
(2) Date: Nov. 10, 2022

(87) PCT Pub. No.: WO2021/228899
PCT Pub. Date: Nov. 18, 2021

(65) Prior Publication Data
US 2023/0189861 A1 Jun. 22, 2023

(30) Foreign Application Priority Data

May 11, 2020 (EP) .................................. 20173968
Dec. 17, 2020 (EP) .................................. 2021522

(51) Int. Cl.
*C08J 3/12* (2006.01)
*A23L 29/212* (2016.01)
(Continued)

(52) U.S. Cl.
CPC ............... *C08J 3/12* (2013.01); *A23L 29/212* (2016.08); *A23L 29/238* (2016.08);
(Continued)

(58) Field of Classification Search
CPC .... A23L 29/212; A23L 29/238; A23L 29/256; A23L 29/269; C08J 3/12; C08J 2303/02; C08J 2405/00; C08J 2300/16
See application file for complete search history.

(56) References Cited

U.S. PATENT DOCUMENTS 4,557,938 A * 12/1985 Sander .................... A23L 29/20
426/573
4,859,484 A * 8/1989 Bielskis ................ A23L 29/238
516/107
(Continued)

FOREIGN PATENT DOCUMENTS

CN 1193636 A 9/1998
CN 104522389 A 4/2015
(Continued)

OTHER PUBLICATIONS

Meriam-Webster, Unprocessed, https://www.merriam-webster.com/thesaurus/unprocessed, downloaded Nov. 4, 2024. (Year: 2024).*
(Continued)

*Primary Examiner* — Elizabeth Gwartney
(74) *Attorney, Agent, or Firm* — Stacey J. Farmer; Grund IP Group

(57) ABSTRACT

The present invention relates to biodegradable and compostable granules consisting of natural ingredients comprising starch and thickening and gelling agents and does not comprise bioplastics. According to the invention, the granules are used for producing biodegradable and preferably compostable products and articles of daily use. The present invention also relates to methods for producing the granules
(Continued)

Figure 1A:
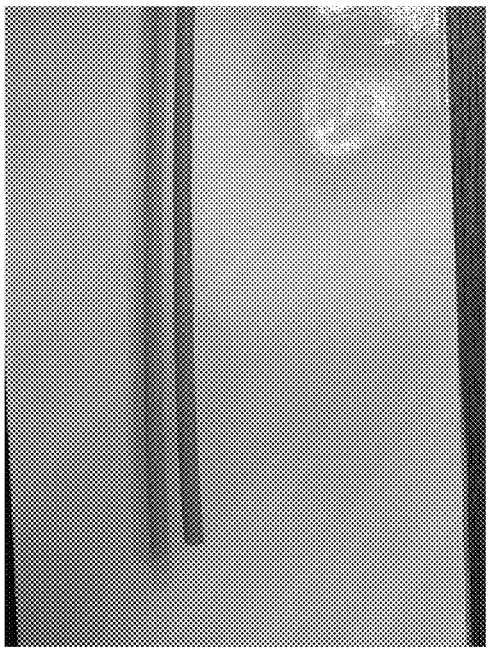

according to the invention, as well as methods for producing different products by using the granules according to the invention.

14 Claims, 5 Drawing Sheets

(51) Int. Cl.
    *A23L 29/238*      (2016.01)
    *A23L 29/256*      (2016.01)
    *A23L 29/269*      (2016.01)
    *A47G 21/18*      (2006.01)
    *B29B 7/42*      (2006.01)
    *B29B 9/06*      (2006.01)
    *B29B 9/14*      (2006.01)
    *B29C 45/46*      (2006.01)

(52) U.S. Cl.
    CPC .......... *A23L 29/256* (2016.08); *A23L 29/269* (2016.08); *A47G 21/18* (2013.01); *B29B 7/42* (2013.01); *B29B 9/06* (2013.01); *B29B 9/14* (2013.01); *B29C 45/46* (2013.01); *C08J 2300/16* (2013.01); *C08J 2303/02* (2013.01); *C08J 2400/16* (2013.01); *C08J 2401/00* (2013.01); *C08J 2405/00* (2013.01); *C08J 2491/00* (2013.01); *C08J 2497/02* (2013.01)

(56) References Cited

U.S. PATENT DOCUMENTS

| | | | |
|---|---|---|---|
| 6,391,352 B1 * | 5/2002 | Hawkes | A23C 9/137 |
| | | | 426/103 |
| 2004/0207113 A1 | 10/2004 | Huisman | |
| 2018/0192803 A1 | 7/2018 | Juviña et al. | |

FOREIGN PATENT DOCUMENTS

| | | |
|---|---|---|
| CN | 110041568 A | 7/2019 |
| DE | 19953867 A1 | 5/2001 |
| DE | 102014107610 A1 | 12/2015 |
| DE | 202019005348 U1 | 4/2020 |
| DE | 202020102635 U1 | 5/2020 |
| EP | 3064542 A1 | 9/2016 |
| WO | 2007062265 A2 | 5/2007 |
| WO | 2019046789 A1 | 3/2019 |

OTHER PUBLICATIONS

Nawab, Anjum et al., "Mango kernel starch-gum composite films: Physical, mechanical and barrier properties", Intl. J. Biological Macromolecues 98, pp. 869-876 (2017).

Saberi, Bahereh, et al. "Optimization of physical and optical properties of biodegradable edible films based on pea starch and guar gum", IIndustrial Crops and Products, 86 pp. 342-352 (2016).

* cited by examiner

GRANULATE OF ONLY NATURAL
CONSTITUTIONS; GRANULATE FOR THE
MANUFACTURE OF COMPOSABLE
PRODUCTS AND METHOD FOR
MANUFACTURING THE GRANULATE AND
THE PRODUCTS OBTAINED THEREFROM

I. CROSS-REFERENCE TO RELATED
APPLICATIONS

This application is a U.S. national stage entry of International Patent Application PCT/EP2021/062550, filed May 11, 2021, published as International Patent Publication WO 2021/228899 on Nov. 18, 2021, which claims the benefit of European Patent Application 20173968.7, filed on May 11, 2020; International Patent Application PCT/EP2020/072820, filed Aug. 13, 2020; German Utility Model No. 20 2020 107 372.9, filed on Dec. 17, 2020; German Utility Model No. 20 2020 107 373.7, filed on Dec. 17, 2020; German Utility Model No. 20 2020 107 374.5, filed on Dec. 17, 2020; and European Patent Application 20215225.2, filed on Dec. 17, 2020; the contents of all are hereby incorporated by reference.

II. FIELD OF THE INVENTION

The present invention is in the field of biodegradable and compostable materials and products made therefrom. In particular, this includes biodegradable and compostable material in the form of granules which can be used for the production of biodegradable and compostable articles of daily use. The granules can also be used to produce biodegradable and compostable packaging materials and films. Thus, the provided granules and products made from them provide a substitute to conventional plastic granules and plastic or polystyrene products. Using vegetable starch and vegetable thickener and gelling agent in a certain ratio, biodegradable and even garden compostable granules can be produced. The addition of glycerin, sorbitol, vegetable fibers (such as straw fibers, grass fibers, etc.), pulp, wood pulp, stearate, oil, natural latex in particular natural rubber and/or wax, in particular canola wax or soy wax, can give the granules further advantageous properties. Here, the granules or the product resulting therefrom can be produced in transparent, opaque or non-transparent embodiments. Optionally, the color of the granules or product can be modified by adding food coloring. Optionally, the addition of natural fragrances and flavors can modify the odor of the granules or product. Optionally, the taste of the granules or product can be modified by adding flavors.

III. BACKGROUND OF THE INVENTION

In Germany alone, thousands of tons of plastic products are produced every day and then consumed and thrown away. Particularly in demand are disposable products or articles of daily use that are consumed by the hundreds of thousands every day because of their advantages-they are easy to use, practical and hygienic. Such products have so far been made of conventional plastic or contain so-called bioplastics. Products made of plastic, are neither well recyclable nor are they compostable, they can mostly only be burned or recycled at enormous cost and energy expenditure and thus harm the preservation of our ecosystem. Even products made from supposedly biodegradable bioplastics such as PLA can demonstrably not be completely degraded or composted. This fact has led to a ban on the use of bioplastics in single-use products from mid-2021. As a result, the need for an environmentally friendly, recyclable and compostable alternative to conventional plastic and bioplastic for producing various products is enormous and also imperative to minimize the ecological footprint.

Conventional plastic granulate escapes easily and partly unnoticed from the production and processing chain and then often ends up in bodies of water, thus forming a large proportion of the microplastic or plastic waste in seas and on coasts. Plastic granules are therefore also often found in the digestive tract of seabirds and marine animals which suffer death from the resulting health consequences.

This problem does not arise with the present granules. The granules of the present invention dissolve easily on land and in seas and could even be consumed by humans and animals without causing harm.

The granules of the present invention provide a sustainable alternative to plastic granules and the products derived therefrom, together with processes for their production. In contrast to conventional plastic granules and products made therefrom, the granules according to the present invention and the products made therefrom consist of purely vegetable and/or natural, untreated materials, in particular vegetable starch and vegetable thickening and/or gelling agent, and optionally vegetable fibers such as straw fibers, grass fibers, baobab fibers, pulp, wood pulp, vegetable biopolymers, vegetable preservatives and vegetable waxes.

Granules are the typical delivery form of thermoplastics from raw material manufacturers for the plastics processing industry. Because of its pourability, it is a bulk material like sand or gravel and thus just as easy to transport and portion as the latter. However, there are also melt granules for end users. The material disclosed here can be easily processed into granules, i.e., bulk material. Subsequent further processing of the granules is also trouble-free. The granules produced and the products made therefrom are not only easy to recycle or compost, they are also produced from renewable raw materials that have a positive carbon footprint. Therefore, as a raw material of various products, the granules of the present invention form a sustainable and environmentally friendly alternative to conventional plastic.

IV. SUMMARY OF THE INVENTION

The present invention relates to biodegradable and compostable granules. According to the invention, the granules are used for the production of biodegradable and preferably compostable products and articles of daily use. The present invention also relates to methods for producing the granules according to the invention, as well as methods for producing different products by using the granules according to the invention. The invention is defined by the claims and is summarized below.

The granules of the present invention consisting of natural, preferably purely vegetable ingredients comprising starch and thickening and gelling agents, and having a solid composition consisting of

| | |
|---|---|
| Vegetable starch | 40-60% |
| Thickening and/or gelling agent | 40-60% |
| Optional additives | 0-20%, | wherein the granules have a residual moisture of 10-30%, preferably 15-22%.

In a preferred embodiment, the granules have a solid composition consisting of.

| | |
|---|---|
| Vegetable starch | 40-50% |
| Thickening and/or gelling agent | 40-50% |
| Optional additives | 0-20% | and has a residual moisture of 15-22%.

The residual moisture in the granules can preferably be 19-20%.

The vegetable starch in the granules is native, unprocessed starch and comprises wheat starch, potato starch, corn starch, tapioca starch, or starch from cassava, tuber bean, batata, yam, tuberous pea, arakacha, tuberous wood sorrel, bulbous nasturtium, ulluco, east Indian arrowroot, arrowroot, achira, taro, tannia, white water lily, yellow pond rose, or chayote, or a mixture, preferably wheat starch, potato starch, corn starch, rice starch, tapioca starch, or a mixture thereof.

The thickening and/or gelling agent in the granules comprises guar gum, xanthan gum, devil's tongue, agar agar, pectin, carrageenan, alginate, locust bean gum, sago, gum arabic, rice flour, durum wheat flour or semolina, or a mixture thereof.

Optional additives in the granules comprise vegetable glycerin and/or sorbitol, pulp, wood pulp, vegetable fiber, wax, natural rubber, biopolymer, oil, preservatives, vinegar, lecithin, vegetable stearate, food coloring, flavors, fragrances, and a mixture thereof.

The granules do not comprise bioplastic, chemically modified (bio) polymers comprising bio-based polymers comprising polylactide (PLA), polyhydoxyalkanoates (PHA), polyhydroxybutyrate (PHB), and petroleum-based biopolymers.

The granules can also have a solid composition consisting of

| | |
|---|---|
| Starch | 40-50% |
| Thickening and/or gelling agent | 40-50% |
| Optional additives | 0-20% | and a residual moisture content of 19-20%.

The granules may also have a solid composition consisting of

| | |
|---|---|
| Starch | 45-50% |
| Thickening and/or gelling agent | 45-50% |
| Optional additives | 0-10% | and a residual moisture of 15-22%, preferably 19-20%.

The starch and the thickening and/or gelling agent are preferably present in a ratio of 1:1.

In an even more preferred embodiment, the granules consist of a solid composition of

| | |
|---|---|
| Wheat starch | 50% |
| Guar gum | 45% |
| Xanthan gum | 5% | and a residual moisture content of 15-22%.

The invention further relates to a method for producing granules comprising the steps of:
a) preparing a mixture consisting of solid and liquid ingredients, said mixture consisting of

| | |
|---|---|
| Vegetable starch | 40-60% |
| Thickening or gelling agent | 40-60 |
| Optional additives | 0-20% | further comprising based on the weight of the mass:
Liquid ingredients

| | |
|---|---|
| comprising water | 30-60%; | b) compacting the mass and forming a granules-strand;
c) curing and dehumidifying the granules-strand produced in step b), leaving in the granules-strand a residual moisture of 10-30%, preferably 15-22%;
d) cutting the granules-strand produced in c) into granules.

Preferably, in step a), the solid ingredients and the liquid ingredients are first mixed separately and then the mixture of the solid ingredients is mixed with the mixture of the liquid ingredients.

In a preferred embodiment of the method for producing granules, the mixture in step a) comprises:

| | |
|---|---|
| Vegetable starch | 40-50% |
| Thickening and gelling agents | 40-50 |
| Optional additives | 0-20% | further comprising based on the weight of the mass:

| | |
|---|---|
| Liquid ingredients comprising water | 40-50%. |

In another preferred embodiment of the method for producing granules, the mixture in step a) comprises:

| | |
|---|---|
| Vegetable starch | 45-50% |
| Thickening and gelling agents | 45-50% |
| Optional additives | 0-10% | further comprising based on the weight of the mass:

| | |
|---|---|
| Liquid ingredients comprising water | 40-50%. |

In an even more preferred embodiment of the method for producing granules, the mixture in step a) comprises:

| | |
|---|---|
| Wheat starch | 50% |
| guar gum | 45% |
| xanthan gum | 5% | further comprising based on the weight of the mass:

| Water | 40% |
|---|---|
| Vegetable glycerin | 5% |
| Canola oil | 4% |

Optionally, in the method for producing granules, step d) can be performed before step c).

Optionally, step b) is performed in a screw extruder.

The present invention also relates to the use of the granules for the production of biodegradable, preferably compostable, articles of daily use.

The invention further relates to a method for the production of biodegradable and compostable articles of daily use using the granules according to the invention.

The method for producing biodegradable, preferably compostable, articles of daily use using the granules according to the invention comprises processing the granules by injection molding or extrusion.

The method for the production of biodegradable, preferably compostable articles of daily use, wherein, in addition to the granules according to the invention, no further additives are required for the production of the articles, but optionally fragrances and/or coloring and/or flavors can be added.

In one embodiment, the starting material for producing biodegradable, preferably compostable articles of daily use by injection molding or extrusion comprises granules.

In one embodiment, the starting material for producing biodegradable, preferably compostable articles of daily use by injection molding or extrusion consists of granules.

In a preferred embodiment, the starting material for the production of biodegradable, preferably compostable articles of daily use by injection molding or extrusion-molding consists of granules and a further additive selected from the group consisting of one or more fragrances, one or more colorants, one or more flavors.

The granules may be processed by injection molding or extrusion, wherein the processing in injection molding is performed at a temperature of between 50° C. and 100° C. and in extrusion at a temperature of between 50° C. and 110° C.

The invention further comprises a biodegradable, preferably compostable article of daily use made from granules according to the invention.

The article of daily use according to the invention is preferably suitable for skin contact and food contact.

The biodegradable, preferably compostable article of daily use is preferably resistant to breakage, tensile strength and high temperatures. In addition, the article of daily use preferably exhibits high resistance to water, fats and oils.

Moreover, both the granules and the articles of daily use made therefrom are garden compostable. The granules and the articles of daily use made therefrom are also ultra-compostable.

V. ADVANTAGES OF THE INVENTION

The use of granules of the present invention proves advantageous in many respects.

By using the vegetable raw materials starch (e.g., wheat starch), thickening and/or gelling agents (e.g., a mixture of guar gum and xanthan gum), as well as optional additives such as vegetable fibers, the granules, as well as the products of the present invention made therefrom, are, in contrast to conventional plastic products, easily recyclable, fully biodegradable and naturally compostable. The composting time of a drinking straw made from granules according to the invention was determined. The test showed a composting time of the drinking straw of less than four weeks in intensive rotting, and of 27 days in dry digestion. This value is far below that of alternative drinking straws. Optional coating of the drinking straws prolongs the composting process by only a few days, so that even coated articles of daily use such as coated drinking straws made from granules of the present invention can be composted within 4-8 weeks. Furthermore, the granules of the present invention and the products made therefrom are compostable according to EN 13432, version 2000-12. Moreover, the granules and the articles of daily use made therefrom are also garden compostable. In addition, the granules and the products made therefrom are ultra-compostable, i.e., composted in less than 50 days. This does not apply, for example, to bioplastics/bioplastics such as PLA. In addition, articles of daily use made from the present granules have been tested as food safe by a competent authority (DEKRA e.V.).

The vegetable starch is used as a natural product, i.e., in a natural, unmodified and untreated form, and is also not chemically modified during the production process into granules. This protects the environment and makes the granules even more natural. The extrudate produced in the production process, which is dried and cut into granules, is also not chemically/physically post-treated to solidify and/or stabilize it.

The present granules further do not comprise bioplastics, biobased plastics, or petroleum-based biopolymers. Bioplastics are defined as any biopolymers obtained by chemical modification of natural and/or plant-based raw materials. Certain petroleum-based polymers are also biodegradable and therefore, by definition, "biopolymers." Petroleum-based polymers comprise polyvinyl alcohol (PVA), polybutylene adipate terephthalate (PBAT), polybutylene succinate (PBS), polycaprolactone (PCL), and polyglycolide (PGA). Petroleum-based polymers are not used at present and are not a component of the granules or the articles of daily use obtained from them. Bio-based plastics produced by extensive chemical modification of biogenic raw materials (e.g., polylactides (PLA) made from lactic acid produced using white biotechnology) are not comprised in the granules or the articles of daily use made from them. Furthermore, in addition to polylactide (PLA), polyhydroxyalkanoates (PHA), polyhydroxybutyrate (PHB), epoxyacylates and lignin-based substances such as thermoplastics are also included in bio-based plastics.

Compared to other biodegradable and/or compostable articles of daily use, articles of daily use made from the present granules have a very high material density. It should be noted that the granulation, i.e., the production of the granules of the raw materials of the mixture can be considered as a "pre-compaction" of the material. By using the pre-compacted granules, the material can be further compacted and homogenized in further processing. Furthermore, compaction and homogenization using the granules occurs more easily and quickly than using the raw materials themselves. By using the granules, the production process of a biodegradable and compostable article of daily use is therefore more energy-saving and time-efficient. Due to the high density of the material already existing in the granules, an even higher density can therefore be created in the end product in the further processing procedure than would be created in an end product produced directly from the raw materials.

This high material density is guaranteed by using the granules provided. The high material density results in a previously unattainable stability of the articles produced from the granules, which means that the granules can be used to produce a wide variety of different articles of daily use. The high material density can be inferred from the comparative tests described herein with respect to tensile and fracture strength.

In addition, the pre-compacted granules but especially the final product produced from the granules has a higher resistance to liquids such as water, oils and greases due to the density.

Furthermore, the surface structure of the products made from granules is very smooth due to the high density in the material. This has haptic and visual advantages. The product made from the granules feels very high quality due to the smooth structure. However, a smooth surface also has a higher tension than a rough surface and thus also causes a higher resistance to liquids such as water.

Due to the high density and resulting stability of the final product, the granules of the present invention can be used to make various articles of daily use such as: aids for eating or drinking, such as drinking straws, drinking cups, ice cream cups, liquor glasses/shot glasses, French fries forks, disposable cutlery in general, ice cream spoons, coffee stirrers, medical supplies such as cotton swabs, toothbrushes and mouth spatulas, but also articles of daily use such as disposable clothes hangers, combs, balloon holders, dosage spoons e. g. for washing powder or coffee, staples, and also packaging material such as vegetable/fruit transport trays, disposable bags, foils, trays and the like. It should be noted that the present granules can be processed into any previously existing short-lived plastic product. In addition, the high density of the material leads to a longer service life of the article of daily use in connection with liquids and food, to be mentioned here are drinking straws, ice-cream cups and ice-cream spoons. Drinking straws made from the present granules in consideration of the methods of production disclosed herein are stable for up to 8 hours, but at least 6 hours, when placed in a liquid such as water or juice. The high material density of the granules and products made therefrom also has a positive effect on the transport properties of the granules and products made therefrom. Granules can be transported easily and in portions as litter or bulk material in bags or boxes without pulverizing. Therefore, the granules can be transported easily and in a space-saving way to any place in the world. However, the stability of the end products gained by the material density also minimizes wear and tear when transporting the finished products. Thus, breakage during transport is minimized and can be ruled out under normal circumstances. No loss is incurred.

Using the production process described herein for end products (articles of daily use) made from the granules according to the invention, fast and therefore optimal process cycle times of 6-14 seconds from filling of the granules to removal of the product from the mold (injection molding) can be achieved. The granules provided can easily be used in combination with a vacuum filler. Automatic filling of the injection molding machine then enables a machine running time of 24 h/day.

The granules and the products made from them are not intended for consumption. Due to the density of the material, the products are normally very hard, and it is therefore difficult to bite off. However, if parts are inadvertently consumed or enter the digestive tract of a human or animal, there is no health risk due to the purely vegetable and/or natural raw materials. The material is completely degraded. Consumption of the granules disclosed herein or of the articles of daily use made from them is not hazardous to health even in large quantities and is excreted by the organism without residue.

VI. BRIEF DESCRIPTION OF THE DRAWINGS

Figure 1B:
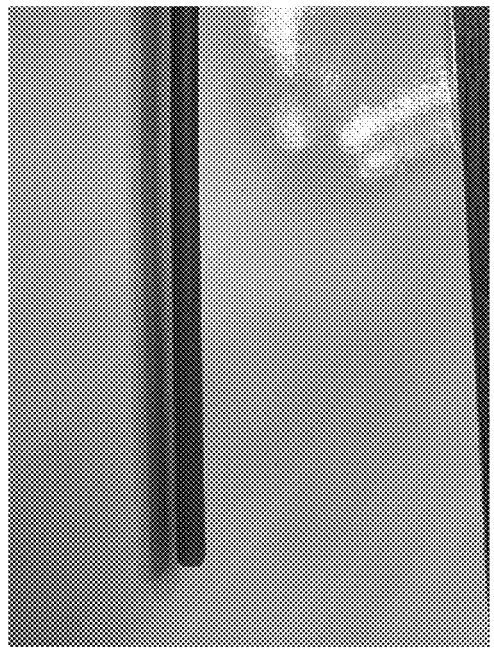
Figure 1C:
Figure 1D:
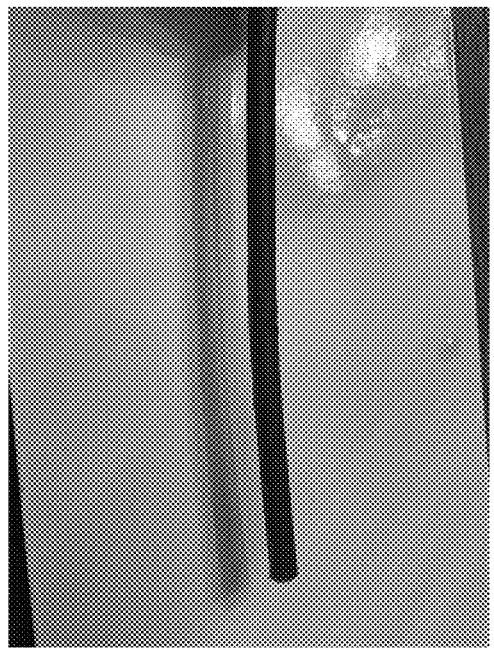

FIG. 1A to FIG. 1D show different drinking straws that were placed in lukewarm water for 10 min, then taken out and photographed. FIG. 1A: Pasta Straw, drinking straw made of pasta dough comprising wheat flour; FIG. 1B: Wisefood Staw, drinking straw made by Wisefood company comprising cereal and apple peel; FIG. 1C: Rice Straw, drinking straw comprising rice flour; FIG. 1D: Bao Straw, drinking straw made from granules according to the invention.

Figure 2A:
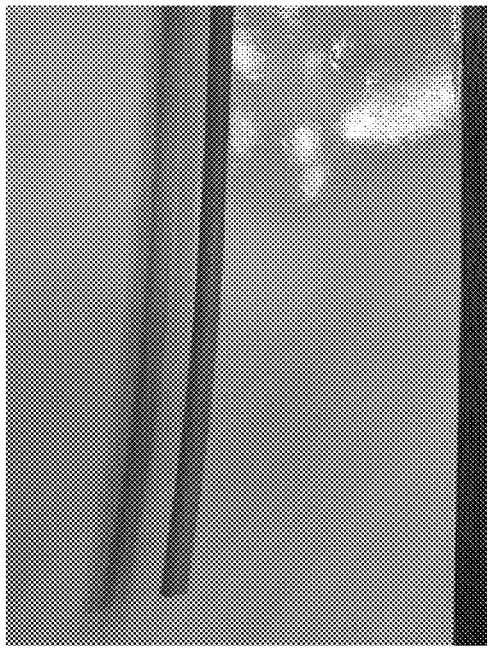
Figure 2B:
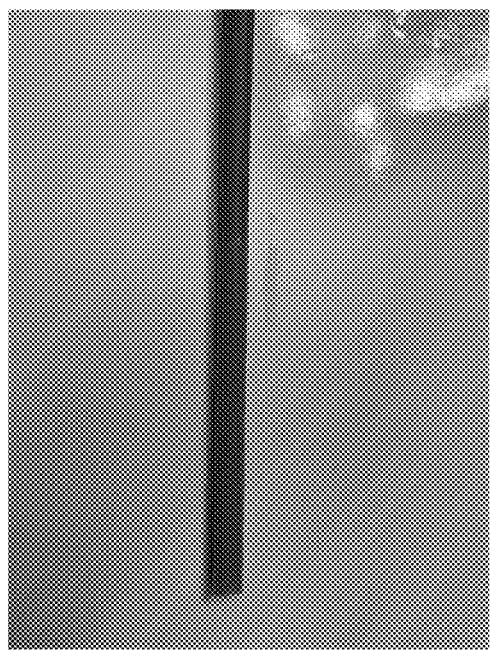
Figure 2C:
Figure 2D:

FIG. 2A to FIG. 2D show different drinking straws that were placed in lukewarm water for 30 min, then taken out and photographed. FIG. 2A: Pasta Straw, drinking straw made of pasta dough comprising wheat flour; FIG. 2B: Wisefood Staw, drinking straw made by Wisefood company comprising cereal and apple peel; FIG. 2C: Rice Straw, drinking straw comprising rice flour; FIG. 2D: Bao Straw, drinking straw made from granules according to the invention.

Figure 3A:
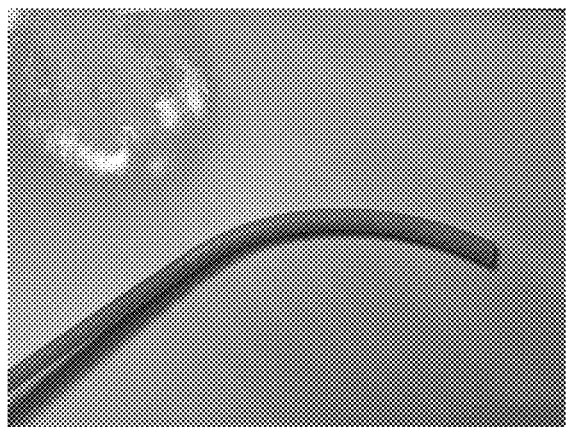
Figure 3B:
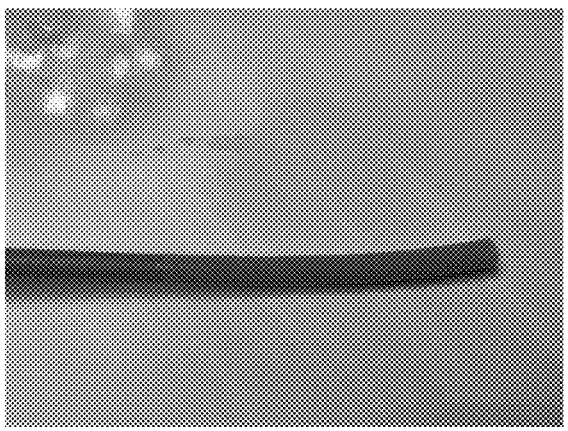
Figure 3C:
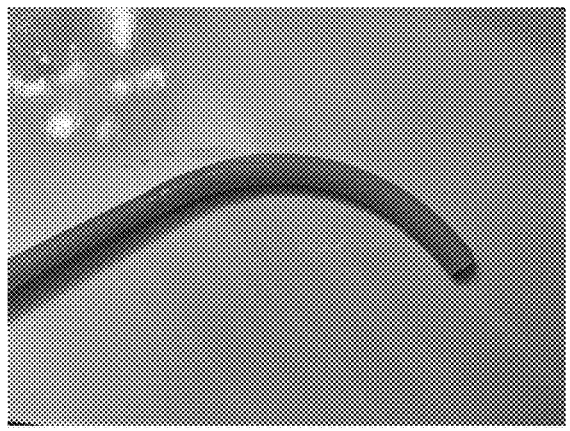
Figure 3D:
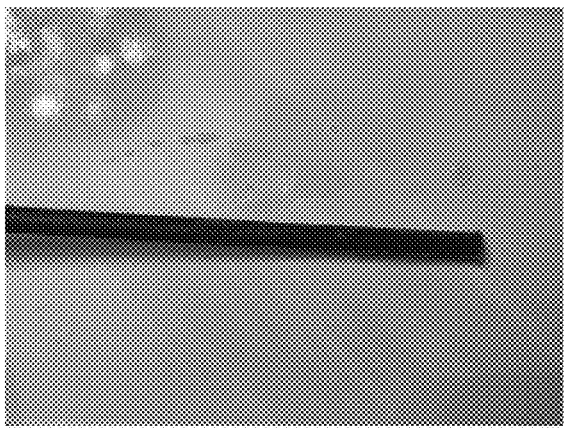

FIG. 3A to FIG. 3D show different drinking straws that were placed in lukewarm water for 60 min, then taken out and photographed. FIG. 3A: Pasta Straw, drinking straw made of pasta dough comprising wheat flour; FIG. 3B: Wisefood Staw, drinking straw made by Wisefood company comprising cereal and apple peel; FIG. 3C: Rice Straw, drinking straw comprising rice flour; FIG. 3D: Bao Straw, drinking straw made from granules according to the invention.

Figure 4A:
Figure 4B:
Figure 4C:
Figure 4D:

FIG. 4A to FIG. 4D show different drinking straws that were placed in lukewarm water for 120 min, then taken out and photographed. FIG. 4A: Pasta Straw, drinking straw made of pasta dough comprising wheat flour; FIG. 4B: Wisefood Staw, drinking straw made by Wisefood company comprising cereal and apple peel; FIG. 4C: Rice Straw, drinking straw comprising rice flour; FIG. 4D: Bao Straw, drinking straw made from granules according to the invention.

Figure 5A:
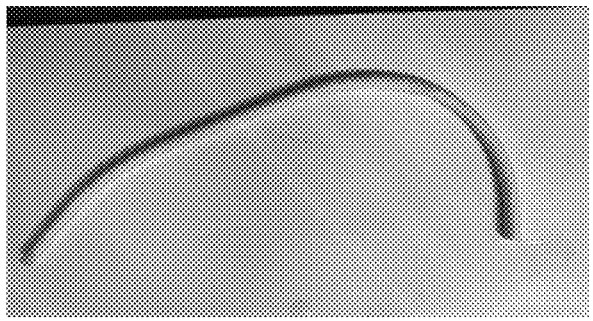
Figure 5B:
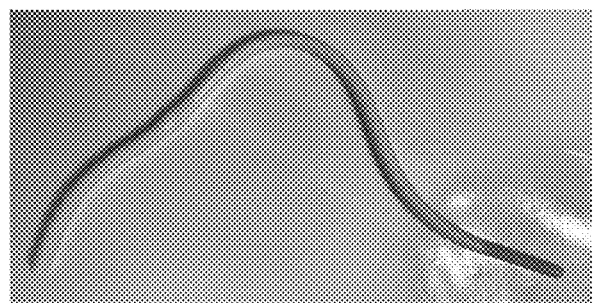
Figure 5C:
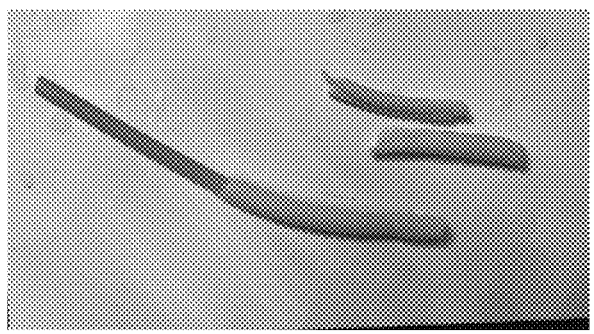
Figure 5D:

FIG. 5A to FIG. 5D show various drinking straws that were placed in lukewarm water for 24 hours, then taken out and photographed. FIG. 5A: Pasta Straw, drinking straw made of pasta dough comprising wheat flour; FIG. 5B: Wisefood Staw, drinking straw made by Wisefood company comprising cereal and apple peel; FIG. 5C: Rice Straw, drinking straw comprising rice flour; FIG. 5D: Bao Straw, drinking straw made from granules according to the invention.

VII. DETAILED DESCRIPTION OF THE INVENTION

Definitions

"Vegetable starch" refers to any starch obtained from plant material. The starch may be obtained from roots, beets, tubers, rhizomes, shoot axes, leaves, fruits or seeds, for example. Exemplary plant starches comprise wheat starch, potato starch, corn starch, rice starch, or tapioca starch; starch from cassava (*Manihot esculenta*), tuber bean (*Pachyrhizus tuberosus*), batata (*Ipomoea batatas*), yam (*Dioscorea* spec.), tuberous pea (*Lathyrus tuberosus*), arakacha (*Arracacia xanthorrhiza*), tuberous wood sorrel (*Oxalis* tuberosa), tuberous nasturtium (*Tropaeolum tuberosum*), ulluco (*Ullucus tuberosus*), east Indian arrowroot (*Tacca leontopetaloides*), arrowroot (*Maranta* spec.), achira (*Canna indica*), taro (*Colocasia esculenta*), tannia (*Xanthosoma sagittifolium*), white water lily (*Nymphaea alba*), yellow pond rose (*Nuphar lutea*), or chayote (*Sechium edule*).

"Vegetable fibers" means fibers derived from plants, such as straw fibers or grass fibers. The plant-derived fibers may have a fiber length of 0.5-3.8 mm in the granules. Preferably, the fibers have a length of 0.7-1.1 mm.

"Pulp" refers to the fibrous mass produced during chemical pulping of plants, primarily wood. It consists to a large extent of cellulose. For the drinking straws of the present invention, pulp with short fibers is preferably used. Pulp can be present in granules with a fiber length of 0.5-3.8 mm. Preferably, the fibers have a length of 0.7-1.1 mm. The pulp of the present invention may be derived from many different plants, such as conifers, deciduous trees or bamboo. In particularly preferred embodiments, the pulp is at least partially derived from baobab plant material. In another particularly preferred embodiment, the pulp is at least partially derived from bamboo plant material.

"Wood pulp" refers to the fibrous mass produced during mechanical pulping of plants, especially wood. Wood pulp, unlike pulp for higher quality papers, contains large amounts of lignin. Preferably, wood pulp with short fibers is used for the granules of the present invention. Wood pulp may be present in the granules with a fiber length of 0.5-3.8 mm. Preferably, the fibers have a length of 0.7-1.1 mm. In some embodiments of the present invention, a combination of wood pulp and pulp is used.

"Natural fibers" is a general term and comprises vegetable fibers, pulp and wood pulp.

"Vegetable thickeners" and "vegetable gelling agents" are thickeners and gelling agents derived from vegetable or bacterial resources. Preferred are thickening and gelling agents from plant resources. They cause gelation of liquid. Exemplary vegetable thickening or gelling agents are agar agar, pectin, carrageenan, alginates, locust bean gum, guar gum, sago, xanthan gum, gum arabic, rice flour, durum wheat flour or durum wheat semolina.

"Guar gum" (also known as food additive E 412) is a vegetable thickener or gelling agent. It is obtained from ground seeds of the guar plant. It is particularly noteworthy that guar gum considerably enhances the effect of other vegetable thickening or gelling agents and is therefore popular for use with other vegetable thickening or gelling agents.

"Xanthan gum" (also known as food additive E 415), or "xanthan", is a bacterial thickening and gelling agent. It is produced by bacteria of the genus *Xanthomonas* from sugar-containing substrates. Preferably, the xanthan gum of the present invention is derived from bacteria of the species *Xanthomonas campestris*. As an alternative to xanthan gum, devil's tongue may be used in the present invention.

"Devil's tongue" (*Amorphophallus konjac*) (also known as food additive E 425) is a species of plant belonging to the genus Titanium root. The tuber of this plant is called konjac root. The flour of the tuber shows excellent film-forming properties and becomes hydrating, it is gray mottled and tasteless. Unlike conventional gelatin, konjac does not dissolve quickly. The addition of devil's tongue or xanthan gum are beneficial to the viscosity of the mass, giving it excellent flow properties in the production of the granules but also in the further processing of the granules into products.

"Agar agar" refers to a galactose polymer derived from algae. Agar agar is obtained from the cell walls of algae, especially red algae.

"Pectin" (also known as food additive E 440a or E 440b) refers to plant polysaccharides essentially comprising $\alpha$-1-4-glycosidically linked galacturonic acids. They can be obtained, for example, from peels of apples, lemons and other fruits. Pectin is a vegetable thickening or gelling agent and thus ensures that liquids gel.

"Carrageenan" (also known as food additive E 407) is a vegetable thickener or gelling agent derived from various species of red algae.

"Alginate" is a vegetable thickening or gelling agent and consists of salts of alginic acid. It can be extracted from dried and ground brown algae. Depending on the salt, it is known by the E numbers E 401, E 402, E 403, E 404 and E 405.

"Locust bean gum" (also known as food additive E 410) is a vegetable thickener or gelling agent obtained from locust bean tree seeds by grinding. The flour obtained is white and tasteless.

"Sago" is a vegetable thickening or gelling agent. Sago is obtained from the starchy pith of various plant species such as sago palm, cassava, or potato. It is often sold as granules in the form of small balls. Sago swells about threefold in hot liquid and has a strong binding effect when cooled. To prevent the liquid from becoming mushy, sago is boiled or soaked only until the globules are soft but still retain their shape.

"Gum arabic" (also known as food additive E 414) is a vegetable thickener and gelling agent derived from the resinous sap of *acacia* species native to Africa, such as *Acacia senegal*. Gum arabic can be present in both powder and gum form.

"Rice flour" is a vegetable thickener and gelling agent obtained by de-husking rice grains and then finely milling them. Depending on the use of polished or unpolished (brown) rice grains, white or brown rice flour is obtained.

"Durum wheat flour" is a vegetable thickener and gelling agent obtained from durum wheat (*Triticum durum*), also known as durum, durum wheat or glass wheat. The durum grains are hulled and then ground several times to produce durum wheat flour.

"Durum wheat semolina" is a vegetable thickener extracted from durum wheat (*Triticum durum*), also known as durum, durum wheat or glass wheat. As with durum wheat flour production, the durum grains are hulled and then milled. However, the durum grains are milled less frequently than in durum wheat flour production, so durum semolina has a coarser particle structure.

"Wax" means any naturally occurring wax, such as carnauba wax, beeswax or soy wax. Preferred in the present invention is canola wax, soy wax or carnauba wax. "Carnauba wax" is obtained from the leaf of the carnauba palm (*Copernicia prunifera*). The leaves are harvested, and the wax is separated by drying and mechanical action. The wax is used in various industries, such as food, cosmetics and pharmaceuticals. Untreated carnauba wax has a light yellowish, greenish to dark gray color, it is interspersed with air bubbles, hard, brittle and insoluble in water. Carnauba wax is the hardest natural wax with the highest melting point of over 80° C. It is also edible, so it is naturally food-grade, and has a mild taste. This is advantageous because the granules and the products made from them have no inherent odor. In addition, the addition of carnauba wax to the materials in the granules comprising vegetable starch and thickening and/or gelling agents makes the processing of the materials smoother, but also contributes to the strength, hardness and resistance of the granules and product derived therefrom. In the present invention, carnauba wax is preferably used in powder form. "Soy wax" is obtained from ripe soybeans (*Glycine max*). The soybeans are harvested, and first soybean oil is obtained. This is hydrogenated, under pressure of about 200 bar and at a temperature of about 140° C.-225° C. in the presence of a metallic catalyst, soy wax is obtained. The wax is used in various industries, such as cosmetics and candles. Untreated soy wax has a very light, creamy white, sometimes yellowish color, is hard, brittle and insoluble in water. Soy wax has a melting point of about 50° C. It is also edible and has a mild taste. This is advantageous for granules and the products obtained from them, as they thus have no inherent odor. In addition, the addition of soy wax to the substances in the granules comprising vegetable starch and thickening and/or gelling agents makes the processing of the substances smoother, but also contributes to the strength, hardness and resistance of the granules and product obtained therefrom. In the present invention, soy wax is preferably used in powder form. Biopolymers such as natural rubber may optionally be added to the above wax. "Canola wax" is obtained from the seeds of canola (*Brassica napus*) or also from the close relative oilseed rape (*Brassica rapa* subsp. *oleifera*). The seeds are harvested, and first canola oil is extracted. By hardening canola oil, canola wax is obtained. The melting point of canola wax is approximately between 57° C. and 61° C. Canola wax is also edible and has the beneficial properties described for carnauba wax and soy wax.

"Biopolymer" is a polymer based on plant raw materials that is biodegradable. An exemplary biopolymer is natural rubber, also called gum elasticum or *resina elastica*. Natural rubber offers higher resistance to water than waxes. Therefore, natural rubber itself or blends thereof are particularly advantageous in the production of an end product from granules. Natural rubber can either be contained in the granules themselves, but can also serve as a component of a coating on an article of daily use made from granules. This is advantageous for products that come into contact with liquids, such as drinking straws. Natural rubber is used in the form of natural latex/natural latex milk, alternatively in the form of an emulsion based on natural rubber and water with a solids content of 40-65%, preferably 50-60%, most preferably 60% rubber. Furthermore, plant-based biopolymers comprise celluloid, cellophane, cellulose-based vulcanized fiber, cellulose nitrate, cellulose propionate and cellulose acetate butyrate, starch blends and renewable raw materials such as lignin, chitin, casein, vegetable gelatin. Furthermore, vegetable oils such as castor oil are among the biopolymers. It should be noted that in the present description "biopolymer" is not equated with "bioplastic", "bioplastic" and similar chemically processed polymers.

"Emulsion" means any distributed mixture of multiple components, such as one or more solids and a solvent such as water. An emulsion may be a wax emulsion or rubber emulsion. An emulsion according to the invention comprises carnauba wax, rubber and water. Natural latex is also an emulsion of rubber and water.

"Oil" means any vegetable, mineral or animal oil. Preferably, the oil in the present invention is a vegetable oil. Particularly preferred are canola oil, nut oil and sunflower oil.

"Compostable" refers to the property of a material to be 90% degraded after 6 months under defined aerobic conditions. The compostability of a material can be determined according to DIN EN 13432, version 2000-12. Compostability herein refers to both industrial composting and non-industrial composting by purely biological decomposition or rotting (home composting). Thus, the granules according to the invention and the products obtained therefrom are compostable both by means of intensive rotting and by means of dry fermentation within 4-8 weeks, preferably within 4 weeks, so that the granules and the products have completely dissolved within this time.

"Garden compostable" means the property of a material to be completely degradable only by exposure to the atmosphere, for example, on a compost pile.

"Ultracompostable" means the characteristic of a material to be completely degradable only by exposure to the atmosphere, for example, on a compost pile within 50 days.

"Biodegradable" refers to the characteristic of a process to completely degrade an organic substance biologically, that is, by living organisms or their enzymes. In this process, the degradation of the substance takes place under aerobic conditions in 10 years or less, preferably in 5 years, even more preferably in 1 year.

"Recyclable" means that after the material has been used (for example, as a drinking straw), it can be used through a reprocessing (recycling) process as a material to make a new product that is not intended for incineration. For example, products described herein made from granules can serve as raw material in producing recycled granules after being crushed for use. Further, residues in the production process can be crushed and recycled (so-called wood chips or wood shavings). This is in contrast to materials that, after use, must either be recycled by incineration or permanently landfilled.

"Magnesium stearate" Magnesium stearate is the magnesium salt of stearic acid and belongs to the lime soaps. It is obtained from fats and oils by splitting their glycerides using magnesium, soaps and glycerin. Magnesium stearate is used, for example, in the pharmaceutical industry as an auxiliary in tablet or granule production. Magnesium stearate is also used in some sweets. Magnesium stearate can be produced from fats of both animal and vegetable origin. Soybean, canola or corn germ oil is often used. The substance is also useful because it has lubricating properties that prevent ingredients from sticking to producing equipment during compression of chemical powders into solid tablets. Magnesium stearate is the most commonly used lubricant for tablets. In producing pressed candies, magnesium stearate acts as a release agent and is used to bind sugars in hard candies such as mints. Magnesium stearate is commonly used as a lubricant at concentrations ranging from 0.25% to 5.0% in producing tablets, capsules and other oral dosage forms. Due to its long-standing use as an excipient in the pharmaceutical, food and cosmetic industries, the safety of magnesium stearate is well documented.

"Calcium stearate" Calcium stearate is used for the production of so-called non-tox stabilizers of plastics, preferably in combination with zinc stearate, but also barium stearate or magnesium stearate. It is also used as a lubricant in pharmaceutical products and as a lubricant (buffer grease) in the paper and metal processing industries, as a water repellent for building materials and in sand processing. Technical calcium stearate is obtained by reacting calcium chloride with the sodium salt of stearic acid (usually contaminated with the sodium salt of palmitic acid) and then washing out sodium chloride. It is an impregnating agent for textiles. In plastics, it can act as an acid scavenger or neutralizer in concentrations up to 1000 ppm, as a lubricant, and as a release agent. It can be used in plastic colorant concentrates to improve pigment wetting. In rigid PVC, it can accelerate fusion, improve flow and reduce stamp swelling. Applications in the personal care and pharmaceutical industries include tablet mold release agents, non-stick agents and gelling agents. Calcium stearate is a component of some types of defoamers. In addition, calcium stearate is an anti-caking agent that allows the fine mobility of solids, preventing powdered ingredients from caking together. In papermaking, calcium stearate is used as a lubricant to achieve good gloss, and to prevent dusting and wrinkle cracking in paper and board production. An addition of about 0.1 to 10% is possible.

"Zinc stearate" is a white powder with a melting point of 130° C., a flash point of 277° C. and a self-ignition temperature of 420° C. The molecular weight is 632.3 g/mol. Zinc stearate is not soluble in water. Zinc stearate is used as a stabilizer for emulsions. In card magic, zinc stearate is used as a card powder, which improves the gliding properties of playing cards. Zinc stearate is also used as a lubricant in plastics processing. It prevents polyamide parts from sticking to each other and is an aid in plasticizing problems. If the plasticizing screw does not draw in the material properly, this can be improved by adding approx. 0.2% zinc stearate, especially for polyamide 6.0. If the plasticizing screw does not draw in the material properly, this can be improved by adding approx. 0.2% zinc stearate.

"Glycerin" Glycerin is the trivial name and common name of propane-1,2,3-triol and is preferably used as a liquid (as a solution, preferably as a 100% solution) in the present invention, but may also be used as a solid. Glycerin is used presently as a lubricant and humectant. Preferred is E 422, which is obtained predominantly from vegetable fats and oils. Production from synthetic or animal substances is also possible. Preferred is "vegetarian glycerin" or "vegan glycerin", which is produced by the transesterification of vegetable oils. As a food additive, E 422 is generally approved for all foods and there is also no maximum amount restriction for the use of glycerin. In the present invention, the addition of glycerin increases the mobility of the material. As an alternative to glycerin, sorbitol may also be used in the present invention.

"Sorbitol" is a natural plasticizer and is used as a plasticizer. It is industrially produced from glucose (dextrose) obtained from corn and wheat starch; the glucose is then converted to glucitol by catalytic hydrogenation. As with all products produced via starch saccharification in Europe, there are no genetically engineered products on the market for sorbitol, although the use of genetically modified organisms would be possible to produce sorbitol. In the present invention, sorbitol is used as a lubricant and humectant. Preferred is E 420, also preferred is "vegetarian sorbitol" or "vegan sorbitol". As a food additive, E 420 is generally approved for all foods. In the present invention, the addition of sorbitol increases the mobility of the material.

"Excipients" are substances that impart further advantageous properties to the granules and products made therefrom, for example in terms of shape, manufacturability, stability. Excipients comprise, for example, antioxidants, baking powders, binders, emulsifiers, stabilizers, colorants, fragrances or odor neutralizers and/or brighteners. These excipients are biodegradable. Odor neutralizers in this context comprise substances from vanilla, lemon lavender or fir.

"Rubber" refers to natural rubber present as an emulsion with water, as well as natural latex or natural latex milk, such as natural latex Laguna from the company Colok GmbH. The latex or rubber emulsion may additionally comprise a release agent such as Struktol® or ammonia. The preferred solids content of a rubber emulsion is 60% rubber. Natural latex and rubber emulsion refer to the same emulsion and are to be understood interchangeably.

"Anti-stick additives", also "anti-sticking agents" or "anti-tack additives", or "anti-tack agents" prevent granules according to the invention from sticking to each other, but can also be optionally added only during processing of the granules into various products. The terms are known to those skilled in the art. The exact compositions of such anti-stick or anti-tack additives are manufacturer-specific. Anti-tack additives are preferably used with rubber emulsion or latex. Anti-stick additives or anti-tack additives comprise oils, glycerin, sorbitol, lecithin, vegetable fats and vegetable stearates.

"Residual moisture" describes the moisture content in the finished granules or product made from them. A residual moisture of 20%, for example, means that the moisture content in the finished granules is still 20%. The residual moisture is measured by means of an electronic moisture indicator such as a wood moisture meter.

Figures in % are to be understood as mass fraction or weight percent (wt %), unless explicitly stated otherwise. For example, if a mixture from which granules are made consists of 50% starch and 50% thickener and/or gelling agent, then a mixture weighing 1000 g will consist of 500 g starch and 500 g thickener and/or gelling agent. If 70% water is added to this mixture (1000 g) based on the total weight of the mixture, 700 g water is added.

Any additives and ingredients of the present invention are approved for use in food and are purely vegetable or natural based.

Biodegradable and Compostable Granules

The present invention relates to biodegradable and compostable granulates comprising vegetable starch and vegetable thickening and gelling agent with optional refinement by addition of further vegetable and/or natural raw materials. In this regard, the granules may comprise 40-60% starch and 40-60% thickening and/or gelling agent, plus optionally 0-20% natural additives such as fibers, preservatives, oils, waxes, stearates, glycerin, colorants, flavors, fragrances, and other of the additives described herein. Preferably, the granules comprise a solids content (%=wt %) of 40-50% starch, 40-50% thickening and/or gelling agents, and 0-20% other ingredients. More preferably, the granules comprise a solids content consisting of 45-50% starch, 45-50% thickening and/or gelling agent, and 0-10% other ingredients. The ratio of starch to thickening and/or gelling agent in the granules is preferably 1:1. Starch and thickening and/or gelling agent are therefore preferably present in equal proportions. This ratio is preferably maintained even with optional refinement by admixture of further vegetable and/or natural constituents. The granules also have a residual moisture content of 10-30%, preferably 15-22%, even more preferably 19-20%.

The vegetable starch contained in granules according to the invention is a native/natural, non-treated starch comprising wheat starch, potato starch, corn starch, rice starch, tapioca starch or starch from cassava, tuber bean, batata, yam, tuberous pea, arakacha, tuberous wood sorrel, tuberous nasturtium, ulluco, east Indian arrowroot, arrowroot, achira, taro, tannia, white water lily, yellow pond lily, or chayote, or a mixture thereof. Preferably, the vegetable starch contained in granules of the invention is wheat starch, potato starch, corn starch, tapioca starch, or a mixture thereof, and particularly preferred is wheat starch.

The vegetable thickening and/or gelling agent contained in granules according to the invention comprises guar gum, xanthan gum, agar agar, pectin, carrageenan, alginate, locust bean gum, sago, gum arabic, rice flour, durum wheat flour or semolina, or a mixture thereof. Preferably, the thickening and/or gelling agent contained in granules according to the invention is a mixture of guar gum and xanthan gum. The proportion of thickening and/or gelling agent influences the appearance of the granules and the products produced therefrom. The addition of thickening and/or gelling agent may affect the degree of transparency of the product. In addition, the amount of thickening and/or gelling agent can also affect the density of the material. The lower the proportion of thickening and/or gelling agent in the mixture, the higher the swelling capacity of the material produced in the molding process and, accordingly, the lower the density of the material. However, the swelling capacity is also related to the heat supplied during the production and forming process. Thus, a product of different density can be produced. For a product with a low density but with more air spaces, less material is required for injection into the production machine (injection molding), because the material expands in the mold. The product resembles polystyrene in appearance. In contrast, a product with a higher proportion of thickening and/or gelling agent in the mixture has a higher density. Accordingly, more material is then injected into the mold to produce a product with plastic-like properties.

The granules preferably have a residual moisture content of 15-22%, more preferably 19-20%. A higher residual moisture in the granules can lead to a greasy mass in the further production process of products made from the granules. If the residual moisture is too low, the granulate material will not crosslink in the further production process. As a result, the material warps, does not compact, and thus no stable product is produced. In addition, a smooth surface of the product is not produced.

Furthermore, the granules may contain one or more of the following additives (finishes).

The granules may additionally comprise vegetable glycerin. Glycerin is used herein as a solution. Vegetable glycerin has water-retaining properties. It is used as a moisturizer and emollient. The addition of glycerin can increase the flexibility of the granules and products made from them. Sorbitol can be used as an alternative to glycerin.

The granules can additionally comprise pulp and/or wood pulp. This increases the mechanical stability and breaking strength of the granules and products made therefrom, and can thus prevent the products from buckling, splintering or tearing. The granules of the present invention contain up to 20% pulp, wood pulp or vegetable fibers. A higher content would complicate further processing into products, as the products produced would become too brittle. Particularly good mechanical properties result at a content of 4-10%. Compared to wood pulp, pulp has the advantage that the products produced are more transparent.

The granules may additionally comprise vegetable fibers, such as straw fibers and/or grass fibers. Like pulp or wood pulp, the addition of vegetable fibers increases the mechanical stability of products made from them. Compared to pulp, vegetable fibers, as with wood pulp, have the advantage that products produced have greater stability and fewer chemicals were used in their production. The granules of the present invention contain up to 20% vegetable fibers. Fibers are used in a length of 0.5-3.8 mm. A fiber length of 0.7-1.1 mm is optimal. Longer fibers can delay or completely prevent the swelling process of the granules as well as the cross-linking of the raw materials in the granules during further processing of the granules, i.e., during the producing of a desired product. Shorter fibers have no effect on increased stability of the final product.

The hardness and flexibility of the granules or the product made therefrom is variable. In some embodiments, the granules or product is hard. In some embodiments, the granules or product is slightly flexible. In other embodiments, the granules or product is rigid. By adding glycerin or one or more of pulp/wood pulp/vegetable fibers, the granules or product can have any desired stability/flexibility. A granule comprising pulp and/or wood pulp and/or vegetable fibers is preferably used to make a very dimensionally stable and hard article, for example, to make a coffee mug or comb. The fibers significantly improve the stability and tear strength of the product. The addition of glycerin makes the granules or product made from them softer and more flexible.

The lower the proportion of vegetable thickener and gelling agent compared to vegetable starch, the more unstable the product produced. Above a starch content of more than 70%, the degree of swelling of the material increases significantly (see special embodiments I and II). Thus, at a minimum starch content of 80%, a fiber content in the mixture is highly preferred, with the fibers significantly improving the stability and tear strength of the product.

Furthermore, the granules may additionally comprise wax, preferably canola wax, soy wax, candelilla wax, rice bran wax or carnauba wax, most preferably canola wax as a solid. The presence of wax in the granules results in products made therefrom having higher resistance to liquids such as water, oils and fats. The addition of wax in the granules can increase the stability of the product in contact with a liquid by at least 10%, at least 20%, at least 25%, at least 30% or even more than 30%. The granules may comprise 1-10% wax, preferably 5% wax, preferably canola wax.

The granules may additionally comprise a biopolymer. Biopolymers also increase the resistance of the products produced from the granules to water, fat and oil. The addition of highly resistant biopolymers in the granules may increase the stability of the product made therefrom upon contact with a liquid by at least 10%, at least 20%, at least 25%, at least 100% or even more than 100%. Preferred biopolymer is natural rubber. Moreover, the granules may therefore additionally comprise natural rubber/natural latex/natural latex milk. Natural rubber may also serve as the main component of a coating of the products made from granules. In particular, drinking straws made from granules benefit from being coated with natural latex in terms of longevity in liquid.

The granules of the invention may further comprise oil, preferably nut or canola oil. Oil improves the flow properties of the raw material during production into granules as well as the granules during production of the product.

The granules may also contain one or more preservatives. By admixing preservatives to the material of the granules, mold growth of the granules or product produced can be counteracted. Preservatives comprise E 220 sulfur dioxide/sulfurous acid, E 221 sodium sulfite, E 222 sodium hydrogen sulfite, E 223 sodium disulfite, E 224 potassium disulfite, E 226 calcium sulfite, E 227 calcium hydrogen sulfite, E 228 potassium hydrogen sulfite, or a mixture thereof. These preservatives are listed as food additives which, in addition to the classic properties of a preservative, also counteract the degradation of colorants, vitamins, fragrances and flavors optionally present in the granules due to the influence of oxygen. Thus, the general shelf life of the granules as well as the product made from them is preserved for longer.

Furthermore, the granules may additionally comprise vinegar and/or lecithin. Vinegar and lecithin are used as binders of the ingredients of the granules. The individual ingredients of the granules can thus be better and more homogeneously bonded together by the addition of vinegar and lecithins.

The granules may additionally comprise a vegetable stearate such as magnesium stearate, calcium stearate, zinc stearate and/or aluminum tristearate. Magnesium stearate, calcium stearate, zinc stearate and aluminum tristearate are used as lubricants or lubricating agents. The granules, or products thereof, are thus less adherent and more easily released from molds, for example. One or more of the stearates may comprise 0.1-10% of the material of the granules. In some embodiments, the granules preferably comprise between 0.4% and 8% magnesium stearate, 0.16% calcium stearate, 0.32% zinc stearate, and/or 1.6% aluminum tristearate.

Optionally, moreover, the color of the granules can be modified by means of conventional food coloring. Further optionally, the odor of the granules can be modified by adding conventional flavors, preferably essential oils.

The shape of the granule pieces is variable. For example, the granules can be drop-shaped, lentil-shaped, cylindrical or bead-shaped, but also flake-shaped (flakes). The diameter of the granulate pieces is variable. The diameter of the granule pieces can be 1-5 mm. In preferred embodiments, the diameter of the granules is 3-5 mm. Exemplary diameters of the individual granule pieces are 1 mm, 1.5 mm, 2 mm, 2.5 mm, 3 mm, 3.5 mm, 4 mm, 4.5 mm, 5 mm. A certain diameter of the granulate pieces is intended to prevent dust formation, which, however, is very low anyway due to the density of the material and the residual moisture and does not normally occur.

Depending on the desired product, the granules can be used for injection molding or for extrusion. In both cases, it is homogenized in a screw channel in a heatable barrel by shearing of the screw and by the action of heat and compressed by dynamic pressure and then injected at high pressure into a desired mold (injection molding), fed through outlet nozzles (extrusion, film extrusion) or blown into a mold as a combination of the two processes (blow molding). In addition, rotational molding can also be used to produce hollow bodies.

Preferred Embodiments of the Granules.

In addition to a residual moisture content of 15-22%, the granules have the following composition of the solids content:

| | |
|---|---|
| Starch | 40-50% |
| Thickening and/or gelling agent | 40-50% |
| Optional additives | 0-20% |

In addition to a residual moisture of 15-22%, the granules preferably have the following composition of the solids content:

| | |
|---|---|
| Starch | 45-50% |
| Thickening and/or gelling agents | 45-50% |
| Optional additives | 0-10% |

In addition to a residual moisture of 15-22%, the granules particularly preferably have the following composition of the solids content:

Variant A:

| | |
|---|---|
| wheat starch | 50% |
| guar gum | 45% |
| xanthan gum | 5% |

Variant B:

| | |
|---|---|
| wheat starch | 45% |
| guar gum | 40% |
| xanthan gum | 5% |
| canola wax | 5% |
| natural rubber powder | 5% |

Variant C:

| | |
|---|---|
| wheat starch | 45% |
| guar gum | 40% |
| xanthan gum | 5% |
| natural rubber powder | 10% |

Variant D:

| | |
|---|---|
| wheat starch | 45% |
| guar gum | 40% |
| xanthan gum | 5% |
| pulp | 10% |

Variant E:

| | |
|---|---|
| wheat starch | 45% |
| guar gum | 40% |
| xanthan gum | 5% |
| straw fibers | 10% |

Variant F:

| | |
|---|---|
| wheat starch | 40% |
| guar gum | 35% |
| xanthan gum | 5% |
| straw fibers | 10% |
| canola wax | 5% |
| natural rubber | 5% |

Variant G:

| | |
|---|---|
| wheat starch | 40% |
| guar gum | 55% |
| xanthan gum | 5% |

Variant H:

| | |
|---|---|
| corn starch | 20% |
| agar agar | 75% |
| xanthan gum | 5% |

Variant I:

| | |
|---|---|
| corn starch: | 45% |
| guar gum: | 40% |
| xanthan gum: | 5% |
| wood pulp: | 9% |
| magnesium stearate: | 1% |

Method of Producing Granules of the Invention

The present invention also comprises methods for producing the granules of the present invention. In this regard, the method has the following steps:
  a) preparing a mixture of solid and liquid ingredients. The solid ingredients comprise

| | |
|---|---|
| Vegetable starch | 40-60% |
| Thickening or Gelling agent | 40-60 |
| Optional additives | 0-20% |

The optional additives comprise vegetable fibers, pulp, wood pulp, wax and/or natural rubber, and flavors, fragrances and other additives described herein, or a mixture thereof. The liquid ingredients comprise water and are added in an amount totaling 30-60% of the total weight of the solid ingredients.
  b) Forming of a granules-strand;
  c) curing and dehumidifying the granules-strand, leaving the granules with a residual moisture content of 10-30%, preferably of 15-22%
  d) cutting the granules-strand produced in c) into granules;

In some embodiments, the process comprises step d), cutting the strand into granules before step c), curing and dehumidifying.

In a preferred embodiment, the method comprises the following steps:
  a) preparing a mixture of solid and liquid ingredients. The solid ingredients comprise 40-60% vegetable starch and 40-60% vegetable thickening and gelling agent preferably in a ratio of 1:1, optionally further comprising 0-20% additives such as vegetable fibers, pulp, wood pulp, wax and/or natural rubber as well as flavors and the like or a mixture thereof, preferably not changing the ratio of starch to thickening and/or gelling agent from 1:1. The liquid ingredients comprise water and are added in an amount totaling 30-60% by weight of the total of the solid ingredients.
  b) Forming of a granules-strand;
  c) curing and dehumidifying the granules-strand, leaving the granules with a residual moisture content of 10-30%, preferably of 15-22%
  d) cutting the granules-strand produced in c) into granules;

Step a

In step a), vegetable starch and vegetable thickening and gelling agent are mixed with liquid comprising water to form a powdery mixture with high residual moisture. This is done with a mixer that stirs the mixture to a homogeneous mass. The mixture may also optionally comprise glycerin, sorbitol, vegetable fibers, pulp, wood pulp, preservatives, flavorings, wax (preferably canola wax, carnauba wax, or soy wax), natural rubber (preferably as an emulsion or powder), stearate (preferably magnesium stearate), oil (preferably nut oil), vinegar, and lecithin and/or other additives described herein.

Here, the solid/dry ingredients should be mixed first (starch, thickeners or gelling agents, fibers, etc.). The liquid ingredients (water, glycerin, oil, food coloring, flavorings, etc.) are then measured by weight relative to the mixture of solid/dry ingredients and mixed together before the mixture of liquid ingredients is added to the mixture of solid ingredients and the mixtures are then blended. This avoids lumping of the mass and improves the homogeneous distribution of the individual ingredients in the mass which is then compacted and extruded.

The proportions of starch to thickener and gelling agent can vary in the range of 40-60% starch and 40-60% thickener and/or gelling agent, but are preferably present in a ratio of 1:1 and preferably remain 1:1, even with the optional addition of other ingredients such as vegetable fibers, wax, rubber, pulp, etc.

Preferred, therefore, is a mixture comprising starch and thickening and gelling agents in a ratio of 1:1, and optionally an addition of one or more further solid ingredients such as vegetable fibers, wax, rubber, pulp, wood pulp, or a mixture thereof. Further, the mixture comprises 30-60%, by weight of the dry matter of the solid ingredients, of liquid ingredients comprising water.

In some embodiments, the vegetable thickening and/or gelling agent in the mixture of step a) comprises guar gum, xanthan gum, agar agar, pectin, carrageenan, alginate, locust bean gum, sago, gum arabic, rice flour, durum wheat flour or durum wheat semolina, or a mixture thereof.

In preferred embodiments, the thickening agent in the mixture of step a) is guar gum and xanthan gum, devil's tongue, agar agar, or pectin, most preferably a mixture of guar gum and xanthan gum.

In some embodiments, the vegetable starch in the mixture of step a) comprises unprocessed starch comprising wheat starch, potato starch, corn starch, rice starch, tapioca starch, or starch from cassava, tuber bean, batata, yam, tuberous vetch, arakacha, tuberous wood sorrel, tuberous nasturtium, ulluco, east Indian arrowroot, arrowroot, achira, taro, tannia, white water lily, yellow pond rose, or chayote, preferably potato starch, corn starch, tapioca starch, or a mixture thereof.

The mixture in a) may additionally comprise one or more of the following additives.

The mixture in a) may additionally comprise vegetable glycerin and/or sorbitol. Here, glycerin is preferably used as a solution, but may also be added in dry form to the liquid portion. Vegetable glycerin has water-retaining properties. It is used as a moisturizer and emollient. The addition of glycerin can increase the flexibility of the granules and products made from them. As an alternative to glycerin, the mixture may comprise sorbitol.

The mixture in a) may additionally comprise pulp and/or wood pulp. Preferably, the pulp and/or wood pulp is at least partially made from baobab or bamboo plant material. This increases the mechanical stability and breaking strength of the granules and the products produced therefrom, and can thus prevent the products from buckling, splintering or tearing. The granules of the present invention contain up to 20% pulp, wood pulp or vegetable fibers. A higher content would complicate further processing into products, as the products produced would become too brittle. Particularly good mechanical properties result at a content of 4-10%. Compared to wood pulp, pulp has the advantage that the products produced have a higher transparency.

The mixture in a) may additionally comprise vegetable fibers, such as straw fibers and/or grass fibers. Like pulp or wood pulp, the addition of vegetable fibers increases the mechanical stability of products made from them. Compared to pulp, vegetable fibers, as with wood pulp, have the advantage that products produced have greater stability and fewer chemicals were used in their production. The mixture of a) may contain up to 20% vegetable fibers. Preferably, however, 1-10%, most preferably 10%. A fiber length of 0.7-1.1 mm is optimal. Longer fibers can delay or completely prevent the swelling process of the granules as well as the cross-linking of the raw materials in the granules during further processing of the granules, i.e., during the production of a desired product. Shorter fibers have no effect on increased stability of the final product.

Furthermore, the mixture in a) may additionally comprise wax, preferably canola wax, soy wax or carnauba wax, most preferably canola wax as a solid. The presence of wax in the granules results in products made therefrom having higher resistance to liquids such as water, oils and fats. The addition of wax in the granules can increase the stability of the product in contact with a liquid by at least 10%, at least 20%, at least 25%, at least 30% or even more than 30%.

Furthermore, the mixture in a) may additionally comprise biopolymers such as natural rubber/natural latex/natural latex milk. Natural rubber increases the resistance of the granules and the products made from them to water, grease and oil. The addition of the highest resistance natural rubber in the granules can increase the stability of the product when in contact with a liquid by at least 10%, at least 20%, at least 25%, at least 100%, or even more than 100%. Natural rubber can also serve as a main component of a coating of the products made from granules. In particular, drinking straws made from granules benefit from a coating with natural latex in terms of longevity in liquid.

The mixture in a) may additionally comprise another non-chemically processed biopolymer. Biopolymers also increase the resistance of products made from the granules to water, grease and oil. The addition of highly resistant biopolymers in the granules can increase the stability of the product made from them when in contact with a liquid by at least 10%, at least 20%, at least 25%, at least 100% or even more than 100%.

The mixture in a) may further comprise oil, preferably nut or canola oil. Oil improves the flow properties of the crude mass during production into granules as well as of the granules during production of the product.

The mixture in a) may also contain one or more preservatives. By admixing preservatives to the material of the granules, mold growth of the granules or product produced can be counteracted. Preservatives comprise E 220 sulfur dioxide/sulfurous acid, E 221 sodium sulfite, E 222 sodium hydrogen sulfite, E 223 sodium disulfite, E 224 potassium disulfite, E 226 calcium sulfite, E 227 calcium hydrogen sulfite, E 228 potassium hydrogen sulfite, or a mixture thereof. These preservatives are listed as food additives which, in addition to the classic properties of a preservative, also counteract the degradation of colorants, vitamins, fragrances and flavors optionally present in the granules due to the influence of oxygen. Thus, the general shelf life of the granules as well as of the product made from them is preserved for a longer time.

Furthermore, the mixture in a) may additionally comprise vinegar and/or lecithin. Vinegar and lecithin are used as binders of the ingredients of the granules. The individual ingredients of the granules can thus be better and more homogeneously bonded together by the addition of vinegar and lecithins.

The mixture in a) may additionally comprise a vegetable stearate such as magnesium stearate, calcium stearate, zinc stearate and/or aluminum tristearate. Magnesium stearate, calcium stearate, zinc stearate and aluminum tristearate are used as lubricants or lubricating agents. The granules or products thereof are thus less adherent and more easily released from molds, for example. In some embodiments, the mixture preferably comprises between 0.25 and 5%, preferably 1% magnesium stearate, 0.1-0.2% calcium stearate, 0.1-0.4% zinc stearate and/or 1.6% aluminum tristearate.

Optionally, food coloring, conventional flavors preferably essential oils, fragrances, flavors and the like may be added to the mixture in a).

PREFERRED EMBODIMENTS

The composition of the mixture for producing granules comprises

| | |
|---|---|
| Starch | 40-60% |
| Thickening or gelling agent | 40-60% |
| Optional additives | 0-20% |

Further comprising based on the weight of the mass:

| | |
|---|---|
| Liquid ingredients comprising water | 30-60 |

The composition of the mixture for producing granules preferably comprises

| | |
|---|---|
| Starch | 40-50% |
| thickening or gelling agent | 40-50% |
| Optional additives | 0-20% |

Further comprising based on the weight of the mass:

| | |
|---|---|
| Liquid ingredients comprising water | 30-60% |

An even more preferred composition of a mixture for producing granules comprises

| | |
|---|---|
| Starch | 45-50% |
| Thickening or gelling agent | 45-50% |
| Optional additives | 0-10% |

Further comprising based on the weight of the mass:

| | |
|---|---|
| Liquid ingredients comprising water | 35-60% |

Particularly preferred compositions of the mixture for producing granules comprise
Variant A:

| | |
|---|---|
| Wheat starch | 50% |
| Guar gum | 45% |
| Xanthan gum | 5% |

Further comprising based on the weight of the compound:

| | |
|---|---|
| Water | 40% |
| Vegetable glycerin | 5% |
| Canola oil | 4% |

Variant B:

| | |
|---|---|
| Wheat starch | 45% |
| Guar gum | 40% |
| Xanthan Gum | 5% |
| Canola wax | 5% |
| Natural rubber powder | 5% |

Further comprising based on the weight of the mass:

| | |
|---|---|
| Water | 30% |
| Vegetable glycerin | 5% |
| Canola oil | 4% |

Variant C:

| | |
|---|---|
| Wheat starch | 45% |
| Guar gum | 40% |
| Xanthan Gum | 5% |
| Natural rubber powder | 10% |

Further comprising based on the weight of the mass:

| | |
|---|---|
| Water | 45% |
| Vegetable glycerin | 5% |
| Canola oil | 4% |

Variant D:

| | |
|---|---|
| Wheat starch | 45% |
| Guar gum | 40% |
| Xanthan Gum | 5% |
| Pulp | 10% |

Further comprising based on the weight of the mass:

| | |
|---|---|
| Water | 40% |
| Vegetable glycerin | 5% |
| Canola oil | 4% |

Variant E:

| | |
|---|---|
| Wheat starch | 45% |
| Guar gum | 40% |
| Xanthan Gum | 5% |
| Straw fibers | 10% |

Further comprising based on the weight of the mass:

| | |
|---|---|
| Water | 40% |
| Canola wax | 5% |
| Natural rubber powder | 5% |
| Vegetable glycerin | 5% |
| Canola oil | 4% |
| E 221 Sodium sulfite | 1% |

Variant F

| | |
|---|---|
| Wheat starch | 40% |
| Guar gum | 35% |
| Xanthan gum | 5% |
| Straw fiber | 10% |
| Canola wax | 5% |
| Natural rubber powder | 5% |

Further comprising based on the weight of this mass:

| | |
|---|---|
| Water | 40% |
| Vegetable glycerin | 5% |
| Canola oil | 4% |

Variant G:

| | |
|---|---|
| Wheat starch | 40% |
| Guar gum | 55% |
| Xanthan gum | 5% |

Further comprising based on the weight of this mass:

| | |
|---|---|
| Water | 40% |
| Vegetable glycerin | 5% |
| Canola oil | 4% |
| Variant H: | |
| Corn starch | 20% |
| agar agar | 75% |
| Xanthan gum | 5% |

Further comprising based on the weight of this mass:

| | |
|---|---|
| Water | 40% |
| Vegetable glycerin | 5% |
| Canola oil | 4% |

Variant I:

| | |
|---|---|
| Corn starch: | 45% |
| Guar gum: | 40% |
| Xanthan Gum: | 5% |
| Wood pulp: | 9% |
| Magnesium stearate: | 1% |

Further comprising based on dry matter:

| | |
|---|---|
| Water: | 60% |

Step b

In step b), the mixture from step a) is formed by extrusion into one or more granules-strand. A "single" or "twin" extruder can be used. The powdery to viscous compound from a) is fed directly into a feed hopper of an extruder, via which the compound is transferred into the barrel of the extruder by means of a feeder. The feed should have a temperature of 45° C. The material can be processed in the barrel at this temperature. The material can be processed in the barrel at a temperature of between 50° C. and 110° C. The temperature of the cylinder should preferably average 70° C. Different temperature ranges can be set using heating bands placed around the cylinder, with overlapping temperature limits in the cylinder. Preferably, five heating bands are placed around the cylinder during extrusion, which are optimally set sequentially from the direction of feed to the outlet at 80° C., 105° C., 100° C., 50° C. The compound is preferably compressed by a screw located in the barrel (screw extruder). Any type of screw (single, double, special extruder or Kneader) can be used. The temperature in the screw channel also depends on the screw geometry. Under energy input, the compound is plasticized.

A homogeneous, inherently cross-linked and compacted mass is produced. The compacted mass is guided by the rotation of the screw to one or preferably several outlets and pressed/extruded through them. Optionally, in a decompression zone upstream of the one or more outlets, the water can be removed from the compacted mass via a degassing dome. In this way, the compacted mass is formed into one or more strands of granules.

Step c

In step c), the granules-strands are dried and cured. This can be done, for example, by drying by means of ventilation/ventilation or dehumidifiers. In some embodiments, the product is fed into a "cooling and cutter" machine where it is dried by fans and thereby cured. However, curing can also take place by means of heat. This may be done alternatively or in addition to curing by means of ventilation. In some embodiments, curing is performed by means of heat in a heating tunnel. The temperature range here is between 25° C. and 100° C., preferably between 45° C. and 90° C., even more preferably 85° C. In some embodiments, the curing is performed by means of dehumidifiers. However, care must always be taken to ensure that the granules retain a residual moisture content of 10-30%, preferably 15-22%.

Step d

In step d), the granules-strands from step c) are cut into granules using rotating blades. Optionally, the blades used for this purpose are cooled with water. The granules are cube- or cylinder-shaped or can be cut into platelets or flakes.

Optional Step d) Before Step c)

In an alternative embodiment of the invention, after step b), the granules-strand is first cut into granules of the desired length and only then dried. The solidification can take place, for example, in a drying tunnel or by fans. The result is a granulate in cylinder, bead or lentil form. Here, too, care must be taken to ensure a residual moisture content of 10-30%, preferably 15-22%, of the granules.

Further Optional Steps

The method may further comprise irradiation of the granules or product with UV light for sterilization.

The finished granules may then be packaged and transported in bags, boxes or other containers.

Method for Further Processing of the Granules

The granules of the present invention can be immediately processed into a final product without further pretreatment or addition of other raw materials. The granules provided are thus a "ready-to-use" product.

Granules according to the present invention that do not yet contain additives such as colorants, flavors, fragrances or stearates, can also have these additives added during further processing. Thus, products with different colors or odors can be produced from "standard granules". The additives are placed together with the granules in the feed hopper of the injection molding machine or extruder.

Depending on the desired product, the granules are processed by injection molding using conventional injection molding machines or by extrusion using conventional extruders. Well-known injection molding machine manufacturers include KraussMaffei, Arburg, Engel and Wittmann Battenfeld.

The residual moisture of the granules of the present invention is decisive for problem-free further processing without admixing additional components such as water or other solvents. The granules must have a residual moisture of 10-40%, preferably 18-22%, most preferably 20%. A residual moisture of the granules in this range results in an optimal compaction and homogenization of the granules in the further production process to the desired products. A higher residual moisture in the granules leads to a smeary mass in the further production process of products made from the granules, which clogs the screw channel in the injection molding machine. This leads to backpressure and production stops. If the residual moisture is too low, the granulate material will not crosslink in the injection molding machine. As a result, the material warps, does not compact, and thus no stable product is produced. In addition, a smooth surface is not produced. It should be noted that unlike plastic granules, the granules of the present invention do not melt but are shape-changed and crosslinked by high pressure in the injection molding machine or the extruder in the screw channel. Accordingly, the residual moisture in the granules can cause differences in the product produced. Feeding granules according to the invention into the screw is problem-free for granules with a residual moisture content of 10-30%, preferably 15-22%. The cycle times in the molding process are also optimally shortened by a residual moisture content of 15-22%, whereby considerable time savings can be achieved in the molding process.

Injection Molding

Almost any shape and size of product can be achieved by injection molding. A conventional injection molding machine (screw plunger injection molding machine) consists of two units, the injection unit or plasticizing unit, which plasticizes, prepares and meters the granules, and the clamping unit, which closes, keeps closed and reopens the mold. The injection unit is essentially composed of a horizontal plasticizing barrel and a screw located inside it. The screw rotates and can also be moved axially in the barrel. At the front end of the plasticizing cylinder is a feed hopper for filling the raw material, in the present case the granules, and at the other end is the nozzle, which is the transition to the mold or clamping unit.

The granules of the invention are first trickled into the feed hopper and then via the feeder into the aisles of the injection molding machine. The feed hopper can be a normal hopper but also a stirring hopper or a hopper set under vibration. The granules are conveyed by a rotating screw towards the tip of the screw and are heated by the heat of the barrel and the frictional heat generated by the cutting and shearing of the material. As explained in more detail below, the material is not melted in this process, as would happen, for example, with plastic granules. The material at hand is cross-linked and compacted and collects in front of the screw tip when the nozzle is closed. Since the screw is axially movable, it recedes due to the pressure of the mass collecting at the tip. The backward movement is braked mechanically or electrically, so that a dynamic pressure builds up in the material. This dynamic pressure, in conjunction with the screw rotation, compacts and homogenizes the material by a further amount. As soon as sufficient mass has accumulated for the workpiece volume, the metering process is completed, and the compacted material is forced under high pressure through the nozzle and the gate or sprue system of the injection mold into the molding cavity. Direct injection without a sprue can also be realized.

The temperature of the plasticizing screw and the other components of the injection molding machine is important when carrying out the procedure for processing the granules at hand. The feed hopper is not temperature controlled. The feed should be preheated to 45° C. At a temperature of 50° C. and 100° C., the granules soften and can be processed. The preferred average temperature for further processing of granules according to the invention is 75° C. The barrel in which the screw channel is located is enclosed by several successive optionally differently tempered heating bands. Between 50° C. and 100° C., crosslinking and densification of the material is given. Therefore, the screw channel is preferably enclosed by four heating bands, which from the direction of the feed hopper to the screw tip preferably have successive temperatures of 45° C., 70° C., 80° C., 90° C. A deviation of more than +/−15% in each case is not advantageous and should be avoided. However, depending on the composition of the granules, a temperature deviation within +/−15% has no negative effect on the material properties of the resulting product. In some embodiments, the three heating bands from the direction of the feed hopper to the screw tip have successive temperatures of 90° C., 80° C., 70° C.

When the granules are processed in a temperature range of between 50° C. and 100° C., a "glass transition" occurs whereby a transition from a viscous and rubbery material in a flexible state to a glassy and hard state takes place. This transition is caused by temperature but also by friction and shear of the screw. The residual moisture in the granules has an effect on this glass transition. Increased residual moisture in the material delays the transition and thus prolongs the production process. A temperature above 90° C. should be avoided. A temperature above 90° C. can cause "warping" of the surface of the product, as well as the whole product. At temperatures between 100° C. and 130° C., warpage was clearly visible in the product. Above a temperature of about 100° C., water vapor and gases are generated in the softened and crosslinking material, which means that the material cannot be processed optimally. Cracks appear in the product. From about 130° C., a strong burnt smell can be detected during processing and a brownish discoloration of the end product. Thermal decomposition starts at about 275° C. The optimum processing temperature of the granules at hand is 80° C. to 90° C.

The screw geometry has an influence on the density of the material and can therefore play a decisive role in the stability and structure of the product produced from the granules. The screw is preferably thinner in the feed section and becomes thicker towards the die. Thus, the material is additionally compacted.

The compacted material is then pressed through the nozzle over the sprue into a mold. The nozzle should preferably have a temperature of 80° C.-180° C. Since the compacted material comes into contact with the nozzle and the heat it supplies for a relatively short time, this has no negative effect on the material. However, a nozzle temperature of 85-95° C. is optimal. The nozzle temperature can also be higher for thick-walled products (>10 mm), around 165° C.

During "injection" of the compacted material into the mold or die, the compound is forced under high pressure through the open nozzle and a sprue or gating system into the molding cavity. The sprue is the part of the mold that does not belong to the final mold and serves as a feed channel to the molding cavity. Heating the molding tool is beneficial for the quality of the resulting product. Heating the mold/tool to between 6° and 85° C., preferably 65° C., results in an optimal surface structure of the resulting product. Using a mold that has not been heated can cause spots to form on the surface of the product. In addition, when cold molds are used, the surface structure of the product produced is somewhat rougher than when preheated molds are used. The sprue is difficult to loosen due to the properties of the cross-linked material, especially due to a residual moisture of 10-13%. Therefore, the sprue section should not be too tight and may need to be specially coated. A stainless-steel sprue section was found to be preferred here, whereas an aluminum sprue section was not optimal. A nanocoating of the stainless-steel sprue section was also advantageous. For smaller molded parts, direct injection without a gate proved to be advantageous. It was also observed that the products were particularly easy to release from molds/molds with a surface coating of Teflon, ceramics or nanotechnological solutions.

By way of comparison, in the plastics processing industry, the plastic granules are typically melted at between 200° C. and 300° C. and pressed into a mold at a temperature of 20° C. to 120° C. The temperature gradient here is therefore significantly higher.

After the injection and filling of the mold with the compacted material is complete, the time period over which the product is in the mold also has an effect on the product. At low temperatures in the mold, negative visual and functional characteristics can be seen in the product even at longer cycle times starting from about 20 seconds. For preheated molds, a cycle time of 4-16 seconds is optimal. Accordingly, the short cycle time of 4-16 seconds is advantageous for the overall duration of the production process as well as for the optical and functional properties of the product. However, it should be noted that this time window can change due to the properties of the mold, such as the volume of the mold.

Due to a residual moisture of usually 5-15%, preferably 5-10% in the molded product (before drying), a volume shrinkage can be observed, as is also the case when cooling a thermoplastic. It is not absolutely necessary to "repress" as in plastics processing, i.e., to refill the material under pressure until the sealing point is reached, i.e., until the sprue has solidified. However, it can be used for special molded parts. Instead, a higher volume should be allowed for when creating a mold, so that the final dried product also takes on the desired dimensions.

During cooling or drying of the product made from granules, crystallization takes place. In contrast to the plastic-containing thermoplastic, there is no "peak", as there is no classical melting of the material.

Extrusion

The granules according to the invention can also be processed by extrusion. The process is similar to the injection molding process in terms of temperatures and screw barrel design. In the extrusion process, however, the compacted mass is not injected into a mold/tool, but is pressed directly and continuously out of a molding outlet and discharged. This produces a body with the cross-section of the opening (the extrudate) of theoretically any length. The extrusion process is used in the present case when tubular products such as drinking straws, lolly sticks, holders for balloons, strands for forming clothes hangers, but also products such as films are to be obtained.

A "single" or "twin" extruder can be used. The granules are fed directly into a feed hopper of an extruder through which the compound is transferred to the barrel of the extruder via a feeder. The feed should have a temperature of 45° C. The granules can be processed in the cylinder at a temperature of between 50° C. and 110° C. The temperature of the cylinder should preferably average 70° C. Different temperature ranges can be set using heating bands placed around the cylinder, with overlapping temperature limits in the cylinder. Preferably, five heating bands are placed around the cylinder during extrusion, which are optimally set sequentially from the direction of feed to the outlet at 80° C., 105° C., 100° C., 50° C. The compound is preferably compressed by a screw located in the barrel (screw extruder). Any type of screw (single, double, special extruder or Kneader) can be used. The temperature in the screw channel also depends on the screw geometry. Under energy input, the compound is plasticized. A homogeneous, inherently cross-linked and compacted mass is produced. The compacted mass is guided by the rotation of the screw to one or preferably several outlets and pressed/extruded through them. Optionally, in a decompression zone upstream of the one or more outlets, the water can be removed from the compacted mass via a degassing dome. In this way, the compacted mass is formed into one or more product strands, for example drinking straws.

Products Made from Granules According to the Invention and their Properties

The present invention also relates to a biodegradable and compostable product, an article of daily use, i.e., for everyday use, made from the biodegradable and compostable granules of the invention, wherein the product is a disposable product, film, packaging material, medical supplies or an article of daily use, for example: aids for eating or drinking, such as drinking straws, drinking cups, ice cream cups, shot glasses/shot glasses, French fries forks, disposable cutlery in general, ice cream spoons, coffee stirrers, medical supplies such as cotton swabs, toothbrushes and mouth spatulas, but also articles of daily use such as disposable clothes hangers, combs, balloon holders, dosing spoons e. g. e.g. for washing powder or coffee, staples, and also packaging materials such as vegetable/fruit transport trays, disposable bags, films, trays and the like. Products made from granules contain the same solid composition as the granules themselves.

The product may be colored or uncolored.

The product may be odorless or have a desired odor.

The product is dimensionally stable, but may be harder or softer depending on the granules and additives.

Coating

The resulting product can be coated with a coating comprising natural rubber/natural latex and/or wax, preferably canola wax or carnauba wax. A coating is particularly advantageous for products that are in direct contact with liquids, such as drinking straws.

A wax-based coating containing wax as the main ingredient (wax layer) comprises 30-50% wax, preferably carnauba wax or canola wax, 50-70% water and optionally auxiliaries and/or one or more anti-stick additives. Preferably, the wax-based emulsion contains 32.5% carnauba wax, 17.5% paraffin and 50% water or 32.5% carnauba wax, 17.5% natural latex and 50% water. Another preferred wax emulsion is 50% carnauba wax and 50% water.

A natural latex-based coating is particularly preferred, which contains natural latex as the main ingredient and further comprises fillers. A natural latex-based emulsion consists of 50-95% natural latex 5-10% wax, preferably carnauba wax or canola wax, and optionally auxiliaries and/or one or more anti-stick additives. Other natural latex-based emulsions comprise 10% carnauba wax and 90% rubber emulsion consisting of 60% solid rubber and 40% water or natural latex milk; 5% carnauba wax, 45% rubber and 50% water; 5% canola wax, 45% rubber and 50% water; 5% carnauba wax and 95% natural latex; or 5% carnauba wax, 2% glycerin, 93% natural latex.

In addition, the outer coating may comprise one or more anti-stick additives. The presence of such additives prevents subsequent sticking of the individual products to each other when stacked or lined up or stored and stored side by side. Anti-stick additives of the present invention are oils comprising canola oil, coconut oil and sunflower oil, preferably canola oils. The oil is added at 0-5%, preferably 0.5-1%, most preferably 0.5% of the amount of coating emulsion. Another anti-stick additive is sunflower lecithin or soy lecithin. This can be added in addition to an oil to help the oil mix with the wax emulsion. An additional anti-stick additive is a stearate, such as magnesium stearate of vegetable origin. This can be added to the wax emulsion in an amount of 0.25%-0.75%, preferably 0.3%. The optional anti-stick additive glycerin can either be added to the coating emulsion or sprayed as a kind of second coating onto the cured first coating by means of nozzles or applied by immersion in glycerin solution.

VIII. EXAMPLES

The present invention is described in detail by the following non-limiting examples.

Example 1: Production of Granules, Variant A

The starting material for the production of the granules consisted of:

| | |
|---|---|
| Wheat starch | 50% |
| Guar gum | 45% |
| Xanthan gum | 5% |

Further comprising based on the weight of this mass:

| | |
|---|---|
| Water | 40% |
| Vegetable glycerin | 5% |
| Canola oil | 4% |

First, solid ingredients and liquid ingredients were mixed separately. Then the solid and liquid components were mixed to a powdery mixture (approx. 10-15 min).

Subsequently, the still powdery compound was fed via a hopper and feed (45° C.) into an extruder. This screw in the extruder drew in the produced mixture, compacted and "plasticized" it under energy supply and simultaneously ensured a homogeneous mass. The heated channel of the screw conveyor was heated by five heating elements (in the order: 80C°, 105C°, 100C°, 95° C., 90C°). The screw conveyor transported the mass to the outlets where the mass was pressed out. In this way, the mass was formed into strands and cooled by fans on a conveyor belt. The strands produced were now cut into granules by a rotating blade. During this process, the blade passed through brushes that cleaned it before cutting. This produced a lenticular granulate. Subsequently, the granules cured for 2 days and were finally packaged.

The finished granules have a residual moisture content of 19-20% and a solid composition of

| | | |
|---|---|---|
| Wheat starch | 50% | |
| Guar gum | 45% | |
| Xanthan gum | 5% | |

Example 2: Production of Granules, Variant B

The starting material for the granules consisted of:

| | | |
|---|---|---|
| Wheat starch | 45% | |
| Guar gum | 40% | |
| Xanthan gum | 5% | |
| Canola wax | 5% | |
| Natural rubber powder | 5% | |

Further comprising based on the weight of this mass:

| | | |
|---|---|---|
| Water | 30% | |
| Vegetable glycerin | 5% | |
| Canola oil | 4% | |

First, solid components and liquid components were mixed separately. Then the solid and liquid components were mixed to a powdery mass (approx. 10-15 min).

Subsequently, the still powdery mass was fed via a hopper and feed (45° C.) into an extruder. This screw in the extruder drew in the produced mixture, compacted and "plasticized" it under energy supply and simultaneously ensured a homogeneous mixture. The heated channel of the screw conveyor was heated by five heating elements (in the order: 45C°, 75C°, 100C°, 60C°, 20C°). The screw conveyed the compacted mass to the outlets and pressed it out. In this way, the mass was formed into strands and cut into granules by a rotating blade directly at the outlet. During this process, the blade passed through brushes that cleaned it before cutting. This produced a bead-shaped granulate. Subsequently, the granules cured by means of a dehumidifier for 1 day and were finally packaged.

The finished granules have a residual moisture content of 19-20% and a solid composition of

| | | |
|---|---|---|
| Wheat starch | 45% | |
| Guar gum | 40% | |
| Xanthan gum | 5% | |
| Canola wax | 5% | |
| Natural rubber | 5% | |

Example 3: Production of Granules, Variant F, and an Article of Daily Use Made from it The starting material for the granules consisted of:

| | | |
|---|---|---|
| Wheat starch | 40% | |
| Guar gum | 35% | |
| Xanthan gum | 5% | |
| Straw fibers | 10% | |
| Canola wax | 5% | |
| Natural rubber powder | 5% | |

Further comprising based on the weight of this mass:

| | | |
|---|---|---|
| Water | 40% | |
| Vegetable glycerin | 5% | |
| Canola oil | 4% | |

First, solid components and liquid components were mixed separately. Then the solid and liquid components were mixed to a powdery mass (approx. 10-15 min).

Subsequently, the still powdery mass was fed directly into an extruder. This drew in the produced mass, compacted and "plasticized" it under energy supply and simultaneously ensured a homogeneous mixture. The heated channel of the screw conveyor was heated with five heating elements (in the order: 40C°, 80C°, 100C°, 60C°, 21C°), led the mass to the outlets and pressed the mass out. In this way, the mass was formed into strands and cooled by fans on a conveyor belt. The strands produced were now cut into granules by a rotating blade. During this process, the blade passed through brushes that cleaned it before the cut. This produced a lenticular granulate. Subsequently, the granules cured for 2 days and were finally packaged.

The finished granules have a residual moisture content of 19-20% and a solid composition of

| | | |
|---|---|---|
| Wheat starch | 40% | |
| Guar gum | 35% | |
| Xanthan gum | 5% | |
| Straw fibers | 10% | |
| Canola wax | 5% | |
| Natural rubber | 5% | |

The granules produced were then fed into the rotating screw via a feed hopper. The rotation of the screw in the barrel caused the granules to be conveyed towards the tip of the screw. In this process, friction heat was generated by cutting and shearing of the granules, which, together with the heating of the cylinder by heating bands, ensured deformation of the granules and homogenization of the mass. We had at our disposal a two-cavity mold with an underfloor sprue. The mold was heated to 85° C., the nozzle to 90° C., the cylinder to 90° C., 80° C. and 70° C. in some areas, and the feeder to 45° C. The process was then slowed down by the heating bands.

As the process progressed, the homogenized compound accumulated at the screw tip, where the outlet nozzle is located, which was closed at this point. This resulted in pressure on the screw. Since the screw is axially movable, it screwed backwards out of the homogenized mass under this pressure. The backward movement of the screw was braked by a hydraulic cylinder or by means of electrical control. This created dynamic pressure in the homogenized mass. This dynamic pressure, in conjunction with the rotation of the screw, strongly compressed the homogenized mass and homogenized it further.

As soon as a sufficient quantity of compacted mass for the volume of the product to be produced had accumulated in the screw tip in front of the outlet nozzle, the rotation of the screw was stopped, and the metering process terminated.

This was followed by the injection unit containing the mold moving to the clamping unit. It was pressed against the outlet nozzle and the screw was simultaneously pressurized at the rear. This generated a pressure of around 1,200 bar, with the aid of which the compacted compound was pressed through the outlet nozzle via the sprue system of the mold into the cavity of the mold.

In the mold, the material hardened and finally solidified. Then the ejector side of the mold opened. As it did so, pins entered the cavity of the mold and pushed the molded part out of the mold (forced demolding). It now fell into a waiting container. The molded parts showed a very smooth surface but were still very flexible due to the very high-water content. The sprue was automatically separated. The molded parts then passed through a drying tunnel (circulating air: 85 C.°) for 20 minutes at a length of 20 meters. The residual moisture was removed from the moldings to below 5%, preferably completely.

Finally, the product was stacked and packaged.

Example 4: Functionality Test of Articles of Daily Use Made from Granules

In this experiment, properties of articles of daily use made from granulate variant A were compared with commercially available biodegradable articles of daily use in terms of their tensile/breakage/and tear strength. Furthermore, the dimensional stability and stability in a liquid, in this case water, were compared. The drinking straw was chosen as the article of daily use for this purpose.

A drinking straw produced according to the invention (called "BAO Straw") was compared with a drinking straw made of hardened pasta dough comprising wheat flour, with an edible drinking straw from the company Wisefood comprising ground whole grain, apple fiber and *stevia* ("Wisefood Straw") and with a drinking straw comprising rice flour ("Rice Straw").

In a first test, the tensile strength or tear resistance of the different straws was tested. The results are shown in Table 1. The tensile strength was measured with a hanging balance. The drinking straw was attached at one end. A clamp was attached to the other end, to which a hanging balance was hooked. The hanging balance was pulled until the drinking straw broke off. It should be noted that the drinking straw did not break off in the area of the clamp and that not only the clamp slipped off but that a real tearing apart of the material took place. The respective measured values were given by the measuring instrument in grams.

TABLE 1

| Drinking straw | Pull weight at which the drinking straw broke off (in grams) |
| --- | --- |
| Pasta Straw | 260 g |
| Wisefood Straw | 7700 g |

TABLE 1-continued

| Drinking straw | Pull weight at which the drinking straw broke off (in grams) |
| --- | --- |
| Rice Straw | 740 g |
| BAO Straw | 11100 g |

In a second test, the breaking strength of the different drinking straws was tested. The results are shown in Table 2. The breaking strength was measured with a hanging balance. For this purpose, the drinking straw was attached at both ends. A weight was attached to the free middle section of the drinking straw using a hook. The mass of the weight was increased until the drinking straw broke due to the weight. The respective measured values were given by the measuring instrument in grams.

Table 2

TABLE 2

| Drinking straw | Pull weight at which the drinking straw broke off (in grams) |
| --- | --- |
| Pasta Straw | 500 g |
| Wisefood Straw | 410 g |
| Rice Straw | 700 g |
| BAO Straw | 3910 g |

In a third test, the dimensional stability and stability of other biodegradable drinking straws in contact with liquids such as water was compared with the stability of drinking straws made from variant A granules. The results are shown in Table 3 and in the figures. For this purpose, the drinking straws "Pasta Straw", "Wisefood Straw", "Rice Staw" and a drinking straw according to the present invention ("Bao Straw") were each placed in a glass of water for a period of 24 hours and their swelling in the liquid was measured.

The BAO Straw performed best compared to the other straws, in the conventional hours of use of up to 2 hours. Compared to the others, this one did not swell up and it was still possible to drink from it without any problems. Also, the water did not change visually, which was observed with the other straws, and unlike the other straws, did not contribute to any noticeable inherent taste. This condition was stable for up to 6 hours in water. Thus, it can be said that the BAO drinking straw can be used for 6 hours without any problems. The other tested drinking straws have already become soft after 30 minutes and a use as a drinking straw was no longer possible after 30 minutes in water.

TABLE 3

| WATER CONTACT (TIME) | DRINKING STRAW | OBSERVATION | FIGURE |
| --- | --- | --- | --- |
| 10 minutes | Pasta Straw | lightly swollen. Still stable. | 1A |
|  | Wisefood Straw | lightly swollen. Still stable. | 1B |
|  | Rice Straw | lightly swollen. Still stable. | 1C |
|  | Bao Straw | Unchanged | 1D |
| 30 minutes | Pasta Straw | Visibly swollen. Slightly pliable. | 2A |
|  | Wisefood Straw | Visibly swollen. Slightly pliable. | 2B |
|  | Rice Straw | Heavily swollen and bent. Very slippery and wobbly. | 2C |
|  | Bao Straw | Almost unchanged. Only slight swelling can be seen at the end of the straw upon closer inspection. | 2D |
| 60 minutes | Pasta Straw | Very pliable, slippery and shows slight cracking. | 3A |
|  | Wisefood Straw | Very pliable, slippery and shows slight cracking. | 3B |
|  | Rice Straw | Extremely slippery. Long drawn and exhibits a long crack. | 3C |

TABLE 3-continued

| WATER CONTACT (TIME) | DRINKING STRAW | OBSERVATION | FIGURE |
|---|---|---|---|
| | Bao Straw | Unchanged to after 30 minutes. Only the tip was further swollen upon close inspection. | 3D |
| 2 hours | Pasta Straw | Felt very soft and slightly slippery in the water contact area. Only small cracks appeared when bent. Wet pasta smell. | 4A |
| | Wisefood Straw | Slightly to moderately slippery. Area of water contact is torn off. Synthetic smell. Tastes like dough. | 4B |
| | Rice Straw | Extremely slippery. Large cracks occurred when bent. Tastes like rice. | 4C |
| | Bao Straw | Not slippery except in bubbly areas. Tasteless and still stable. | 4D |
| 24 hours | Pasta Straw | The surface is comparable to the condition after 2 hours. Clearly more cracks after moving the straw. Surface slowly starts to dissolve and emigrates into the water. | 5A |
| | Wisefood Straw | The surface is comparable to the condition after 2 hours. After moving the straw, clearly more cracks. | 5B |
| | Rice Straw | Even more slippery than the Pasta Straws. Surface not yet dissolved. | 5C |
| | Bao Straw | No longer dimensionally stable and already very decomposed | 5D |

Interestingly, it was observed that the decomposition process in water in drinking straws of the present invention (Bao Straw/Bao Drinking Straw) started very slowly at first, but after about 6 hours started and occurred very quickly, so that the dissolution of the drinking straw, i.e., the decomposition into its components and the resulting disintegration of the drinking straw, was achieved earlier than that of the other drinking straws tested. After 24 hours, the drinking straw of the present invention had already decomposed to such an extent that it could be pulverized even at very low pressure, for example between two fingers. Overall, the drinking straw of the present invention exhibits a longer resistance in water over an initial period of time and thus a longer period of use/application of the drinking straw, with a very faster (complete) decomposition then setting in after the usual period of use compared to other biodegradable drinking straws.

Specific Granules and Film Made Thereof (Film Granules)
Granules

The granules preferably produced from variants J and K are used for the production of bio-films. The following variants J and K differ from the previously described granules in their composition in that the mass fraction of starch in the granules is predominant. The liquid content is very high here and also the granules must have a residual moisture of 30-40%, preferably 35%, in order to serve for the production of films. The granules thus have a residual moisture of 30-40% and a solid composition of

| | | |
|---|---|---|
| Starch | 80-85% | |
| Thickener and/or gelling agent | 15-20% | |
| Optional additives | 0-5% | |
| preferably of | | 80% |
| Starch | | |
| Thickening and/or gelling agents | | 18-20%. |
| Optional additives | | 0-2%. |

The vegetable starch in the granules is native, unprocessed starch and comprises wheat starch, potato starch, corn starch, tapioca starch, or starch from cassava, tuber bean, batata, yam, tuberous pea, arakacha, tuberous wood sorrel, bulbous nasturtium, ulluco, east Indian arrowroot, arrowroot, achira, taro, tannia, white water lily, yellow pond rose, or chayote, or a mixture, preferably wheat starch, potato starch, corn starch, rice starch, tapioca starch, or a mixture thereof.

The thickening and/or gelling agent in the granules comprises guar gum, xanthan gum, devil's tongue, agar agar, pectin, carrageenan, alginate, locust bean gum, sago, gum arabic, rice flour, durum wheat flour or semolina, or a mixture thereof.

Preferably, the granules have a residual moisture content of 30-40% and have a solid composition of wheat starch, guar gum and xanthan gum.

The granules may additionally comprise one or more of the following additives.

The granules may additionally comprise vegetable glycerin and/or sorbitol. The addition of glycerin may increase the flexibility of the granules and products made therefrom. Alternatively, to glycerin, the granules may comprise sorbitol.

The granules may additionally comprise wax, preferably canola wax, soy wax or carnauba wax, most preferably canola wax as a solid. The presence of wax in the granules results in film products made therefrom having a higher resistance to liquids such as water, oils and fats. The addition of wax in the granules can increase the stability of the product in contact with a liquid by at least 10%, at least 20%, at least 25%, at least 30% or even more than 30%.

Furthermore, the granules may additionally comprise natural rubber/natural latex/natural latex milk. Natural rubber increases the resistance of the granules and the film products made from them to water, grease and oil. The addition of the highly resistant natural rubber in the granules can increase the stability of the product when in contact with a liquid by at least 10%, at least 20%, at least 25%, at least 100% or even more than 100%. Natural rubber can also serve as the main component of a coating for the film products made from the granules.

The granules may additionally comprise another biopolymer such as cellulose. Biopolymers also increase the resistance of the products produced from the granules to water, grease and oil. The addition of highly resistant biopolymers in the granules can increase the stability of the product made from them when in contact with a liquid by at least 10%, at least 20%, at least 25%, at least 100% or even more than 100%.

The granules may further comprise oil, preferably nut or canola oil. Oil improves the flow properties of the crude mass during production into granules as well as of the granules during production of the product.

The granules may also contain one or more preservatives. By admixing preservatives to the material of the granules, mold growth of the produced granules or film product can be counteracted. Preservatives comprise E 220 sulfur dioxide/sulfurous acid, E 221 sodium sulfite, E 222 sodium hydrogen sulfite, E 223 sodium disulfite, E 224 potassium disulfite, E 226 calcium sulfite, E 227 calcium hydrogen sulfite, E 228 potassium hydrogen sulfite, or a mixture thereof. These preservatives are listed as food additives which, in addition to the classic properties of a preservative, also counteract the degradation of colorants, vitamins, fragrances and flavors optionally present in the granules due to the influence of oxygen. Thus, the general shelf life of the granules as well as the product made from them is preserved for longer.

Furthermore, the granules may additionally comprise vinegar and/or lecithin. Vinegar and lecithin are used as binders of the ingredients of the granules. The individual ingredients of the granules can thus be better and more homogeneously bonded together by the addition of vinegar and lecithins.

Optionally, food coloring, conventional flavors preferably essential oils, fragrances, flavors and the like can be added to the granules. This is advantageous, for example, in producing organic waste bags.

The present granules further do not comprise bioplastics, biobased plastics or petroleum-based biopolymers. Bioplastics are understood to be all biopolymers obtained by chemical modification of natural and/or vegetable raw materials. Certain petroleum-based polymers are also biodegradable and therefore, by definition, "biopolymers." Petroleum-based polymers comprise polyvinyl alcohol (PVA), polybutylene adipate terephthalate (PBAT), polybutylene succinate (PBS), polycaprolactone (PCL), and polyglycolide (PGA). Petroleum-based polymers are not used at present and are not a component of the granules or the articles of daily use obtained from them. Bio-based plastics produced by extensive chemical modification of biogenic raw materials (e.g., polylactides (PLA) made from lactic acid produced using white biotechnology) are not comprised in the granules or the articles of daily use made from them. Furthermore, in addition to polylactide (PLA), polyhydroxyalkanoates (PHA), polyhydroxybutyrate (PHB), epoxyacylates, and lignin-based substances such as thermoplastics are also included in the biobased plastics.

All the ingredients of the granules of the present invention are suitable for skin contact and food contact, and consumption of the granules by humans and animals is not harmful to the organism.

At a residual moisture of 30-40%, the granules may be in the following preferred variants:

| | |
|---|---|
| Potato starch | 80% |
| Pectin | 18% |
| E 221 sodium sulfite | 1% |
| Food coloring blue (spirulina) | 1% |

Variant K:

| | |
|---|---|
| Potato starch | 85% |
| Pectin | 15% |

The granules are produced from a mixture consisting of:

| | |
|---|---|
| Starch | 30-50% |
| Thickening and/or Gelling agent | 3-10% |
| Optional additives | 0-5% |

Further comprising based on the weight of this mixture:

| | |
|---|---|
| Vegetable glycerin (100% solution) | 10-20% |
| Water | 30-50% |

The granules are preferably produced from a mixture consisting of:

Variant J:

| | |
|---|---|
| Potato starch | 38% |
| pectin | 4.6% |
| E 221 sodium sulfite | 1% |
| Food coloring blue (spirulina) | 1% |
| Vegetable glycerin (100% solution) | 17.7% |
| Water 60° C. | 37.7% |

Variant K:

| | |
|---|---|
| Potato starch | 40% |
| Pectin | 4.6% |
| Vegetable glycerin (100% solution) | 17.7% |
| Water 60° C. | 37.7% |

Steps a) to d) of the production process for the granules as described above apply accordingly. The only difference is that the mixing for the production of the film granules is performed in step a) in a single mixing process.

Further processing of the granules by means of blown film extrusion

The granules can serve as starting material for the production of biodegradable, preferably compostable films and film products.

The granules can serve as the sole starting material for the production of biodegradable, preferably compostable films and film products.

To blow thin films, an extruder is combined with a ring die. The granules are fed as described above via a feed hopper into a barrel comprising a screw of an extruder. The mass is homogenized and compacted. The heating bands of the barrel are set at 90° C., 95° C., 110° C., 110° C., 105° C. The nozzle preferably has a temperature of 160° C. The compacted material is formed into a hose in the hose head between the extruder and the annular nozzle and ejected upwards through the nozzle. There, the material hose is inflated with air to several times its original diameter and is pulled upward at increased speed. Not only the pull in the longitudinal and transverse direction, but also the time of cooling determines the film thickness.

Products

From the granules described in this section, film and film products which are biodegradable, preferably compostable, can be produced. The film and film products thus produced are preferably biodegradable and compostable even more preferably biodegradable and garden compostable. The film and film products are preferably suitable for skin contact and food contact.

The product made from the granules is a film. The thickness of the film is variable. The thickness of the film may be 0.001-2 mm, preferably 0.005-1 mm, more preferably 0.005-0.5 mm. The film can be used for a variety of purposes. Products made from blown film comprise packaging, garbage collection bags and bags for organic waste, sanitary films for diapers, shipping envelopes, disposable gloves, and carrier bags. The film can be used, for example, as cling film for covering food, or as gift film for wrapping gifts.

In a particular embodiment, the product is a carrier bag. The carrier bag may be sheet-like or net-like. The size of the tote bag is variable. The bag may have a length of 5-100 cm, preferably 10-70 cm, more preferably 10-50 cm. The bag may have a width of 5-100 cm, preferably 10-70 cm, more preferably 10-50 cm. The thickness of the sidewall is variable. The thickness of the sidewall may have 0.001-5 mm, preferably 0.005-5 mm. more preferably 1-3 mm.

The carrier bag has a variety of uses. For example, the bag can be used as a shopping bag, a fruit or vegetable bag, a trash bag, a freezer bag.

Example 5: Production of Granules Variant J and a Bag Made from them

The starting material for the granules consisted of 38% potato starch, 4.6% pectin, 1% sodium sulfite, 1% food coloring, 17.7% vegetable glycerin (100% solution), 37.7% water at 60° C.

The starting material was stirred in a heated mixer (95° C.) until a homogeneous mass was formed (about 10-15 minutes).

The viscous mass was then poured directly into an extruder. The Extruder drew in the produced mass, compacted and "plasticized" it under energy supply and simultaneously ensured a homogeneous mixture. The heated screw conveyor with five heating elements (in the order 90° C., 95° C., 110° C., 110° C., 105° C.) fed the mass to the nozzles (160° C.) and pressed the mass out. In this way, the mass was formed into strands and cooled on a conveyor belt passing through fans. The strands produced were now cut into granules with a blade. In this process, the blade was cooled with water. This produced a lenticular granulate. This then cured for 2 days.

To produce the bags, the produced granules were again fed into an extruder via a hopper and compressed and crosslinked at 120° C. The granules were then fed into the extruder. Finally, the compound exited from a ring nozzle in the form of a closed film tube, which was discharged upwards. The film became biaxially oriented as it exited the ring nozzle and was then inflated with cooling air. This cooled the film tube to room temperature and gave it its final thickness, stability and tear strength. The bag sections were formed using two heated metal rods (160° C.), which cross-linked the film material in the area of the rods. The film was then transported further via rollers. After passing through the rollers, the film was rolled up into a roll.

In the next step, the film was sprayed with soy wax. The wax was heated to 80° C. for this purpose. After cooling, the film was rolled up again. The spraying created a rough surface layer, which was suitable for printing on the film.

The film was then transported to a die-cutting machine and a handle was punched out. Only now was the film web cut into individual bags and these were stacked by metal bars rotating in a circle.

Example 6: Production of a Lid by Thermoforming

The granules were produced as described in Example 4.

Subsequently, the granules were fed "in-line" directly from the extruder into an automatic molding machine in a uniform manner. Subsequently, the resulting film was heated by means of heating rods (120 C°). In the subsequent nozzle section, the heated film was clamped by means of clamping frames. Compressed air was supplied from above and vacuum was generated from below. This caused the film to be pressed quickly and precisely against the cool mold wall of the lid mold. The film, which was now rigid and solid, was separated from the forming tool by means of forced demolding and then punched out. Thus, a lid was obtained. Special Granules and Polystyrene-Like Articles of Daily Use Made Therefrom (Polystyrene Granules)
Granulate Products with polystyrene-like properties can be produced from these granules.

The granules described herein, especially the following variants L-Q, differ from the first described granules in their composition in that the mass fraction of starch in the granules is predominant. The liquid content is also very high here and must have a residual moisture of 30-40%, preferably 35%, in order to serve for the production of polystyrene-like products. The granules produced from variants L-Q are used, for example, for the production of insulating drinking cups or packaging "polystyrene". It should be noted that these granules are not very stable in shape. Storage in bags would cause the lowest granules to deform and cross-link into a dough-like mass due to the weight of the granules above. Prolonged storage is therefore not preferred. Nevertheless, crosslinked granules can also be used for further processing without any problems. It is merely not free-flowing or strayable.

The granules consist of natural, preferably purely vegetable components comprising starch and natural vegetable fibers and have a solid composition consisting of

| Vegetable starch | 75-90% |
| Natural fibers | 1-10% |
| Thickening and/or gelling agents | 0-10% |
| Optional additives | 0-20%, | the granules having a residual moisture content of 30-40%.

In a preferred embodiment, the granules have a solid composition consisting of

| Vegetable starch | 80-90% |
| Natural fibers | 8-10% |
| Optional additives | 0-2% | and has a residual moisture content of 30-40%.

The vegetable starch in the granules is native, unprocessed starch and comprises wheat starch, potato starch, corn starch, tapioca starch, or starch from cassava, tuber bean, batata, yam, tuberous pea, arakacha, tuberous wood sorrel, bulbous nasturtium, ulluco, east Indian arrowroot, arrowroot, achira, taro, tannia, white water lily, yellow pond rose, or chayote, or a mixture, preferably wheat starch, potato starch, corn starch, rice starch, tapioca starch, or a mixture thereof.

The natural fibers in the granules are purely vegetable fibers comprising straw fibers, grass fibers, pulp, wood pulp and fibers of the baobab tree. Preferably, the pulp and/or wood pulp is at least partially made from baobab or bamboo plant material. The natural plant fibers increase the mechanical stability and breaking strength of the granules and the products made therefrom, and can thus prevent the products from buckling, splintering or tearing. The granules of the present invention contain up to 10% pulp, wood pulp or vegetable fibers. A higher content would complicate further processing into products, as the products produced would become too brittle. Particularly good mechanical properties result at a content of 4-10%. Compared to wood pulp, pulp has the advantage that the products produced are more transparent. A fiber length of 0.7-1.1 mm is optimal. Longer fibers can delay or completely prevent the swelling process of the granules as well as the cross-linking of the raw materials in the granules during further processing of the granules, i.e., during the production of a desired product. Shorter fibers have no effect on increased stability of the final product.

The granules may additionally comprise one or more of the following additives.

The granules may optionally comprise vegetable thickening and/or gelling agent comprising guar gum, xanthan gum, agar agar, pectin, carrageenan, alginate, locust bean gum, sago, gum arabic, rice flour, durum wheat flour or durum wheat semolina, or a mixture thereof.

Preferred thickeners comprise guar gum and xanthan gum, devil's tongue, agar agar, or pectin; most preferred is a mixture of guar gum and xanthan gum.

The granules may additionally comprise vegetable glycerin and/or sorbitol. Here, glycerin is preferably used as a solution, but can also be added in dry form to the liquid portion. Vegetable glycerin has water-retaining properties. It is used as a moisturizer and emollient. The addition of glycerin can increase the flexibility of the granules and products made from them. As an alternative to glycerin, the mixture may comprise sorbitol.

Further, the granules may additionally comprise wax, preferably canola wax, soy wax or carnauba wax, most preferably canola wax as a solid. The presence of wax in the granules results in products made therefrom having higher resistance to liquids such as water, oils and fats. The addition of wax in the granules can increase the stability of the product in contact with a liquid by at least 10%, at least 20%, at least 25%, at least 30% or even more than 30%.

Furthermore, the granules may additionally comprise natural rubber/natural latex/natural latex milk. Natural rubber increases the resistance of the granules and the products made from them to water, grease and oil. The addition of the highest resistance natural rubber in the granules can increase the stability of the product when in contact with a liquid by at least 10%, at least 20%, at least 25%, at least 100%, or even more than 100%. Natural rubber can also serve as a main component of a coating of the products made from granules.

The granules may additionally comprise another biopolymer. Biopolymers also increase the resistance of the products produced from the granules to water, grease and oil. The addition of highly resistant biopolymers in the granules may increase the stability of the product made therefrom upon contact with a liquid by at least 10%, at least 20%, at least 25%, at least 100% or even more than 100%.

The granules may further comprise oil, preferably nut or canola oil. Oil improves the flow properties of the crude mass during production into granules as well as of the granules during production of the product.

The granules may also contain one or more preservatives. By admixing preservatives to the material of the granules, mold growth of the granules or product produced can be counteracted. Preservatives comprise E 220 sulfur dioxide/sulfurous acid, E 221 sodium sulfite, E 222 sodium hydrogen sulfite, E 223 sodium disulfite, E 224 potassium disulfite, E 226 calcium sulfite, E 227 calcium hydrogen sulfite, E 228 potassium hydrogen sulfite, or a mixture thereof. These preservatives are listed as food additives which, in addition to the classic properties of a preservative, also counteract the degradation of colorants, vitamins, fragrances and flavors optionally present in the granules due to the influence of oxygen. Thus, the general shelf life of the granules as well as the product made from them is preserved longer.

Furthermore, the granules may additionally comprise vinegar and/or lecithin. Vinegar and lecithin are used as binders of the ingredients of the granules. Thus, the individual ingredients of the granules can be better and more homogeneously bound together by the addition of vinegar and lecithins.

The granules may additionally comprise a vegetable stearate such as magnesium stearate, calcium stearate, zinc stearate and/or aluminum tristearate. Magnesium stearate, calcium stearate, zinc stearate and aluminum tristearate are used as lubricants or lubricating agents. The granules, or products thereof, are thus less adherent and more easily released from molds, for example. In some embodiments, the granules preferably comprise between 0.25 and 5%, preferably 1% magnesium stearate, 0.1-0.2% calcium stearate, 0.1-0.4% zinc stearate, and/or 1.6% aluminum tristearate.

Optionally, the granules may comprise food coloring, conventional flavors preferably essential oils, fragrances, flavors and the like.

The granules do not comprise bioplastic, chemically modified (bio) polymers comprising bio-based polymers comprising polylactide (PLA), polyhydoxyalkanoates (PHA), polyhydroxybutyrate (PHB), and petroleum-based biopolymers. Thus, the present granules do not comprise bioplastics, biobased plastics, and petroleum-based biopolymers. Bioplastics are defined as all biopolymers obtained by chemical modification of natural and/or vegetable raw materials. Certain petroleum-based polymers are also biodegradable and therefore, by definition, "biopolymers." Petroleum-based polymers comprise polyvinyl alcohol (PVA), polybutylene adipate terephthalate (PBAT), polybutylene succinate (PBS), polycaprolactone (PCL), and polyglycolide (PGA). Petroleum-based polymers are not used at present and are not a component of the granules or the articles of daily use obtained from them. Bio-based plastics produced by extensive chemical modification of biogenic raw materials (e.g., polylactides (PLA) made from lactic acid produced using white biotechnology) are not comprised in the granules or the articles of daily use made from them. Furthermore, in addition to polylactide (PLA), polyhydroxyalkanoates (PHA), polyhydroxybutyrate (PHB), epoxyacylates and lignin-based substances such as thermoplastics are also comprised in bio-based plastics.

All ingredients of the granules of the present invention are suitable for skin contact and contact with food, and consumption of the granules by humans and animals is not harmful to the organism.

Preferred variants of these granules, in addition to a residual moisture content of 30-40%, have the following solid composition Variant L:

| | |
|---|---|
| Wheat starch | 89% |
| Natural fibers | 10% (preferably in a length of 1.9 mm) |
| Magnesium stearate | 1% |

Variant M:

| | |
|---|---|
| Wheat starch | 89% |
| Natural fibers | 9% (preferably in a length of 1 mm) |
| Magnesium stearate | 1% |
| Food coloring (spirulina) | 1% |

Variant N:

| | |
|---|---|
| Wheat starch | 80% |
| Guar gum | 9% |
| Natural fibers | 9% (preferably in a length of 0.9 mm) |
| Magnesium stearate | 1% |
| Food coloring (spirulina) | 1% |

Variant O:

| | |
|---|---|
| Wheat starch | 80% |
| Guar gum | 6% |
| Xanthan Gum | 3% |
| Natural fibers | 9% (preferably in a length of 1.2 mm) |
| Magnesium stearate | 1% |
| Food coloring (spirulina) | 1% |

Variant P:

| | |
|---|---|
| Wheat starch: | 80% |
| Pulp: | 9% |
| Magnesium stearate: | 1% |

Variant Q:

| | |
|---|---|
| Wheat starch: | 80% |
| Plant fibers: | 9% |
| Magnesium stearate: | 1% |

Producing Granules

The granules are produced from a mixture consisting of:

| | |
|---|---|
| Starch | 75-90% |
| Natural fibers | 1-10% |
| Thickening and/or Gelling agents | 0-10% |
| Optional additives | 0-10% |

Further comprising based on the weight of this mixture:

| | |
|---|---|
| Liquid ingredients comprising water | 70-80% |

Preferred variants of the mixture for the production of these granules are:

Variant L:

| | |
|---|---|
| Wheat starch | 89% |
| Natural fibers | 10% (preferably in a length of 1.9 mm) |
| Magnesium stearate | 1% |

Further comprising based on the weight of this mass:

| | |
|---|---|
| Water | 70% |
| Vegetable glycerin | 5% |
| Canola oil | 4% |

Variant M:

| | |
|---|---|
| Wheat starch | 89% |
| Natural fibers | 9% (preferably in a length of 1 mm) |
| Magnesium stearate | 1% |
| Food coloring (spirulina) | 1% |

Further comprising based on the weight of this mass:

| | |
|---|---|
| Water | 70% |

Variant N:

| | |
|---|---|
| Wheat starch | 80% |
| Guar gum | 9% |
| Natural fibers | 9% (preferably in a length of 0.9 mm) |
| magnesium stearate | 1% |
| Food coloring (spirulina) | 1% |

Further comprising based on the weight of this mass:

| | |
|---|---|
| Water | 70% |

Variant O:

| | |
|---|---|
| Wheat starch | 80% |
| Guar gum | 6% |
| Xanthan gum | 3% |
| Natural fibers | 9% (preferably in a length of 1.2 mm) |
| Magnesium stearate | 1% |
| Food coloring (spirulina) | 1% |

Further comprising based on the weight of this mass:

| | |
|---|---|
| Water | 70% |

Variant P:

| | |
|---|---|
| Wheat starch: | 80% |
| Pulp: | 9% |
| Magnesium stearate: | 1% |

Further comprising based on dry matter:

| | |
|---|---|
| Water: | 70% |

Variant Q:

| | |
|---|---|
| Wheat starch: | 80% |
| Plant fibers: | 9% |
| Magnesium stearate: | 1% |

Further comprising based on dry matter:

| | |
|---|---|
| Water: | 55% |

Steps a) to d) of the production process for the granules as described above apply accordingly.

Use of the Granules and Production of Polystyrene-Like Products

The granules can be used as starting material for the production of biodegradable, preferably compostable, articles of daily use.

The granules can preferably be used as the sole starting material for the production of biodegradable, preferably compostable articles of daily use.

The finished granules can also be used as packaging material (packaging flakes). These polystyrene-like packaging flakes can have a residual moisture content of less than 30-40%, preferably 2-30%. This is achieved by further drying the granulate pieces.

The granules can further be used to produce articles of daily use which are biodegradable, preferably compostable.

An article of daily use made from the granules can preferably have polystyrene-like properties and a polystyrene-like structure. That is, the material is heavily foamed and pressed into shape to form a lightweight, foam-like article. The air pockets left in the compressed material give it insulating and heat-insulating properties. The material's properties allow it to be used as insulation or packaging material. "Polystyrene" is used herein to make a comparison with "polystyrene" and its properties. Accordingly, the present granules are suitable for the production of bio-polystyrene/biofoam, which is completely free of plastic and bioplastic.

The article of daily use and the packaging material are preferably biodegradable and compostable.

The article of use made of granules according to the invention and the packaging material are preferably suitable for skin contact and food contact.

The article of daily use made from granules according to the invention can be a cup, a packaging box, a tray, or a packaging container.

In addition, both the granules and the articles of daily use made therefrom are garden compostable. The granules and the articles of daily use made therefrom are also ultra-compostable.

The forms and articles preferably made from these granules are made by injection molding as explained above. When further processing these compounds into a product, it should be noted that a conveying screw is used which is heated to between 75° C. and 95° C., preferably 85° C. It should also be noted that the mold should have a temperature of 220° C.-240° C. Preferably 220° C. To obtain a polystyrene-like product, only a smaller amount of filling volume is injected into the mold, which then swells in the mold. Water vapor and gases escape. This creates a material with lower density but with air spaces, which makes the material lighter and at the same time gives it excellent insulating properties and lower conductivity. Thus, for example, 80° C. hot coffee in the cup can be easily held in the hand by the consumer without burning. With a conventional coffee cup made of coated cardboard, either a so-called "sleeve" is required, or a double-walled cup is used from the outset to avoid burning the hand. Adding fibers can also increase the breaking and tearing strength of a polystyrene-like product.

The main difference with the previously described granules is that in this material with higher starch content and lower injection volume in the mold, the addition of natural fibers is essential for the functionality of the product. Without the added fibers, especially when the starch content exceeds 80%, the product produced would break very easily and would not withstand the use application and would easily break/disintegrate when applied in the hand of the consumer.

Example 7: Production of "Polystyrene Replacement" Granules, so-Called "Packaging Flakes" by Foaming The starting material for producing the granules corresponds to Variant M

| | |
|---|---|
| Wheat starch | 89% |
| Natural fibers | 9% (preferably in a length of 1 mm) |
| Magnesium stearate | 1% |
| Food coloring (spirulina) | 1% | further comprising based on the weight of this mass:

| | |
|---|---|
| water | 70% |

This starting material was stirred in a mixer (35° C.) to form a mixture (10 minutes).

The viscous mass was then poured directly into a twin extruder. A twin extruder is capable of foaming the mass due to the evaporation of water.

The twin extruder drew in the mass, compressed it and "plasticized" it while adding energy, and at the same time ensured a homogeneous mixture. The heated screw conveyor used five heating elements (in the sequence: 70° C.-80° C.-90° C.-100° C.-100° C.) to feed the compound to the nozzles (at about 160° C.) and extrude the compound. A high temperature nozzle at about 160° C. causes swelling of the extruded mass by escape of water vapor from the mass. In this way, the mass was formed into strands with larger air spaces and cooled on a conveyor belt passing through a tunnel of fans. The strands produced were now cut into larger flakes with a blade. During this process, the blade was cooled with water. Packaging flakes were thus obtained. The material thus attains good heat and sound damping properties and is very light.

Example 8: Producing Granules for an Insulating Product (Cup)

The starting material for the granules corresponds to variant L:

| Wheat starch | 89% |
| Natural fibers | 10% (preferably in a length of 1.9 mm) |
| Magnesium stearate | 1% | further comprising based on the weight of this mass:

| Water | 70% |
| Vegetable glycerin | 5% |
| Canola oil | 4% |

The starting material was stirred in a mixer to form a mixture until all the components of the mixture were well mixed (approx. 10-15 minutes).

The still powdery mass was then fed directly into an extruder. This drew in the produced mass, compacted and "plasticized" it under energy supply and simultaneously ensured a homogeneous mixture. The heated channel of the screw conveyor was heated with five heating elements (in the order: 35C°-60C°-60C°-65C°-25C° and led the mass to the outlets and pressed the mass out. In this way, the mass was formed into strands and cooled by fans on a conveyor belt. The strands produced were now cut into granules by a rotating blade. During this process, the blade passed through brushes that cleaned it before cutting. This produced a lenticular granulate. Subsequently, the granules cured for 2 days and were finally packaged.

The ready-to-use granules have a residual moisture content of 30-40% and a solid composition of

| Wheat starch | 89% |
| Natural fibers | 10% |
| Magnesium stearate | 1% |

Example 9: Producing an Insulating Product (Cup) from the Granules of Example 7

The starting material is the granules from example 7 (variant L).

For the production of an injection-molded product, the granules were fed via a feed hopper or an automatic feeder AZ with the aid of a vacuum suction system into a rotating screw located in the barrel of the injection molding machine. The granules were conveyed by the rotation towards the tip of the screw. In this process, friction heat was generated by cutting and shearing of the granules, which, together with the heating of the barrel, ensured homogenization of the granules. The screw was to be a conveying screw and heated to 85 C°. Thus, the mass was pre-compacted and homogenized.

The mass accumulated at the tip of the screw, where the outlet nozzle was located, which was closed at this time. This created pressure on the mass. Since the screw is axially movable, it screwed backwards out of the molten mass under the resulting pressure at the screw tip, similar to a corkscrew. The backward movement of the screw was braked by a hydraulic cylinder or by means of electrical control. This created dynamic pressure in the mass. This dynamic pressure, in conjunction with the rotation of the screw, compressed and further homogenized the mass.

As soon as the quantity of compacted compound was sufficient for the volume of the product to be produced, the rotation of the screw was stopped, and the metering process terminated. At the same time, the screw was actively unloaded in order to decompress the compound.

The injection unit was then moved to the clamping unit. It was pressed against the nozzle and the screw was simultaneously pressurized at the rear. This created a pressure of around 1500 bar, with the aid of which the compound was pressed through the nozzle over the sprue system of the mold into its cavity. Backflow was prevented by means of a non-return valve to prevent the material from shooting out due to water evaporation. The mold was heated to 220 C°. Here, an injection volume of 20% of the volume of the mold was injected, as the material expanded and conformed to the mold due to the high heat exposure. In addition, gases and water vapor escape through an outlet valve of the mold. The baking process takes about 25 seconds. Subsequently, the ejector side of the mold opened. Air pressure was used to separate the molded part (e.g., cups) from the mold. Subsequently, the cups were attached to spray nozzles by a robotic arm by means of suction buttons, which coated the molded part in a rotating backward motion with an emulsion consisting of: 25% natural latex, 25% canola wax and 50% water. The cups were then transported through a drying tunnel (top/bottom heat 65C° for 15 min, 12 meters).

Finally, the product was stacked and packaged. We received a polystyrene/cardboard-like product, in this case a cup.

The invention claimed is:

1. Nonconsumable granules having a solid composition consisting of
   vegetable starch 40-60 wt %
   thickening and/or gelling agent 40-60 wt %, and
   at least one additive,
   wherein the nonconsumable granules have a residual moisture of 15-22%, and
   wherein the at least one additive is vegetable glycerin, sorbitol, pulp, wood pulp, vegetable fibers, wax, natural rubber, biopolymer, oil, preservatives, vinegar, lecithin, vegetable stearate, food coloring, flavors, fragrances, or a mixture thereof.

2. The nonconsumable granules according to claim 1, consisting of
   vegetable starch 40-50 wt %
   thickening and/or gelling agent 40-50 wt %, and
   at least one additive,
   wherein the nonconsumable granules have a residual moisture of 15-22%, and
   wherein the at least one additive is vegetable glycerin, sorbitol, pulp, wood pulp, vegetable fibers, wax, natural rubber, biopolymer, oil, preservatives, vinegar, lecithin, vegetable stearate, food coloring, flavors, fragrances, or a mixture thereof.

3. The nonconsumable granules according to claim 1, wherein the vegetable starch comprises wheat starch, potato starch, corn starch, tapioca starch, rice starch or starch from cassava, tuber bean, batata, yam, tuberous pea, arakacha, tuberous wood sorrel, bulbous nasturtium, ulluco, east Indian arrowroot, arrowroot, achira, taro, tannia, white water lily, yellow pond rose, chayote or a mixture thereof.

4. The nonconsumable granules according to claim 1, wherein the thickening and/or gelling agent comprises guar gum, xanthan gum, devil's tongue, agar, pectin, carrageenan, alginate, locust bean gum, sago, gum arabic, rice flour, durum wheat flour or semolina, or a mixture thereof.

5. The nonconsumable granules according to claim 1, wherein the nonconsumable granules do not comprise bioplastic, chemically modified polymers, or chemically modified bio-based polymers selected from polylactide (PLA), polyhydoxyalkanoates (PHA), polyhydroxybutyrate (PHB), and petroleum-based biopolymers.

6. The nonconsumable granules according to claim 1 consisting of
wheat starch 40-50 wt %
guar gum 35-45 wt %, and
xanthan gum 5 wt %,
at least one additive, wherein the additive is vegetable glycerin, sorbitol, pulp, wood pulp, vegetable fibers, wax, natural rubber, biopolymer, oil, preservatives, vinegar, lecithin, vegetable stearate, food coloring, flavors, fragrances, or a mixture thereof, and
wherein the nonconsumable granules have a residual moisture of 15-22%.

7. The nonconsumable granules according to claim 1, wherein the nonconsumable granules are compostable.

8. A method for producing nonconsumable granules comprising the steps of:
a) preparing a mixture consisting of:
vegetable starch 40-60 wt %
thickening or gelling agent 40-60 wt %,
and further comprising based on the weight of the mass:
liquid ingredients comprising water 30-60 wt %,
wherein at least one additive is added to the solid or the liquid ingredients, wherein the additive is vegetable glycerin, sorbitol, pulp, wood pulp, vegetable fibers, wax, natural rubber, biopolymer, oil, preservatives, vinegar, lecithin, vegetable stearate, food coloring, flavors, fragrances, or a mixture thereof;
b) compacting the mass and forming a strand;
c) curing and dehumidifying the strand produced in step b), wherein the strand comprises a residual moisture of 15-22%; and
d) cutting the strand produced in c) into the nonconsumable granules.

9. The method according to claim 8, wherein the mixture in step a) consists of:
wheat starch 40-50 wt %
guar gum 35-45 wt %,
xanthan gum 5 wt %, and
further comprising based on the weight of the mass:
water 30-45 wt %
vegetable glycerin 5 wt %, and
canola oil 4 wt %.

10. The method according to claim 8, wherein step d) is performed before step c).

11. The method according to claim 8, wherein step b) is performed in a screw extruder.

12. The method according to claim 8, wherein the vegetable starch comprises wheat starch, potato starch, corn starch, rice starch, tapioca starch, or starch from cassava, tuber bean, batata, yam, tuberous pea, arakacha, tuberous wood sorrel, bulbous nasturtium, ulluco, east Indian arrowroot, arrowroot, achira, taro, tannia, white water lily, yellow pond rose, chayote, or a mixture thereof.

13. A method for producing compostable articles of daily use comprising:
a) providing nonconsumable granules consisting of:
vegetable starch 40-60 wt %
thickening and/or gelling agent 40-60 wt %, and
at least one additive,
wherein the nonconsumable granules have a residual moisture of 15-22%, and
wherein the at least one additive is vegetable glycerin, sorbitol, pulp, wood pulp, vegetable fibers, wax, natural rubber, biopolymer, oil, preservatives, vinegar, lecithin, vegetable stearate, food coloring, flavors, fragrances, or a mixture thereof; and
b) forming the compostable articles of daily use by injection molding or by extrusion of the nonconsumable granules.

14. The method according to claim 13, wherein the nonconsumable granule content of the produced compostable articles of daily use is 100%.

* * * * *